(12) United States Patent
Fujishiro et al.

(10) Patent No.: US 10,791,547 B2
(45) Date of Patent: *Sep. 29, 2020

(54) COMMUNICATION CONTROL METHOD

(71) Applicant: KYOCERA Corporation, Kyoto (JP)

(72) Inventors: Masato Fujishiro, Yokohama (JP); Chiharu Yamazaki, Tokyo (JP)

(73) Assignee: KYOCERA Corporation, Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/281,909

(22) Filed: Feb. 21, 2019

(65) Prior Publication Data
US 2019/0191431 A1 Jun. 20, 2019

Related U.S. Application Data

(63) Continuation of application No. 15/469,314, filed on Mar. 24, 2017, now Pat. No. 10,244,515, which is a
(Continued)

(51) Int. Cl.
H04W 72/04 (2009.01)
H04W 36/00 (2009.01)
(Continued)

(52) U.S. Cl.
CPC .......... H04W 72/0413 (2013.01); H04B 7/15 (2013.01); H04W 16/26 (2013.01);
(Continued)

(58) Field of Classification Search
CPC ....... H04W 72/0413; H04W 36/00835; H04W 36/0072; H04W 36/0083; H04W 36/0061;
(Continued)

(56) References Cited

U.S. PATENT DOCUMENTS 9,642,050 B2 5/2017 Fujishiro et al.
2002/0187746 A1* 12/2002 Cheng .................. H04W 74/08
455/11.1
(Continued)

FOREIGN PATENT DOCUMENTS

CN 102098723 B 1/2014
JP 2011-061453 A 3/2011
(Continued)

OTHER PUBLICATIONS

International Search Report issued in PCT/JP2013/058143; dated Jun. 11, 2013.
(Continued)

Primary Examiner — Fahmida S Chowdhury
(74) Attorney, Agent, or Firm — Studebaker & Brackett PC

(57) ABSTRACT

A method applied to a mobile communication system including a first communication apparatus, a first communication apparatus, and chipset included in a first communication apparatus, where the communication apparatus performs relay transmission between a network and a second communication apparatus, includes obtaining, by the first communication apparatus, information indicating a function supported by a network apparatus included in the network, and transmitting to the network apparatus, by the first communication apparatus based on the information, a request message for performing the relay transmission.

3 Claims, 17 Drawing Sheets

Related U.S. Application Data continuation of application No. 14/386,407, filed as application No. PCT/JP2013/058143 on Mar. 21, 2013, now Pat. No. 9,642,050.

(60) Provisional application No. 61/615,087, filed on Mar. 23, 2012, provisional application No. 61/615,045, filed on Mar. 23, 2012, provisional application No. 61/615,067, filed on Mar. 23, 2012, provisional application No. 61/615,073, filed on Mar. 23, 2012, provisional application No. 61/615,059, filed on Mar. 23, 2012.

(51) Int. Cl.
| | | |
|---|---|---|
| *H04W 16/26* | (2009.01) | |
| *H04B 7/15* | (2006.01) | |
| *H04B 7/155* | (2006.01) | |
| *H04W 24/02* | (2009.01) | |
| *H04W 84/04* | (2009.01) | |

(52) U.S. Cl.
CPC ... *H04W 36/0061* (2013.01); *H04W 36/0072* (2013.01); *H04W 36/0083* (2013.01); *H04W 36/00835* (2018.08); *H04B 7/15507* (2013.01); *H04W 24/02* (2013.01); *H04W 84/047* (2013.01)

(58) Field of Classification Search
CPC ... H04W 16/26; H04W 84/047; H04W 24/02; H04B 7/15; H04B 7/15507
See application file for complete search history.

(56) References Cited

U.S. PATENT DOCUMENTS

| | | | |
|---|---|---|---|
| 2009/0197624 A1* | 8/2009 | Kwak | H04W 72/0406 455/517 |
| 2009/0307484 A1* | 12/2009 | Zhang | H04L 63/0464 713/153 |
| 2010/0173644 A1 | 7/2010 | Koyanagi | |
| 2011/0003545 A1* | 1/2011 | Vainikka | H04W 76/10 455/9 |
| 2011/0189999 A1 | 8/2011 | Mueck | |
| 2011/0205900 A1 | 8/2011 | Zhang | |
| 2011/0274030 A1 | 11/2011 | Wang et al. | |
| 2012/0113887 A1 | 5/2012 | Shen et al. | |
| 2012/0202503 A1 | 8/2012 | Kitajo | |
| 2013/0040558 A1* | 2/2013 | Kazmi | H04B 7/15507 455/9 |
| 2013/0094435 A1 | 4/2013 | Deng et al. | |
| 2013/0115955 A1* | 5/2013 | Deng | H04W 48/16 455/437 |
| 2013/0165123 A1 | 6/2013 | Takahashi | |
| 2013/0322388 A1* | 12/2013 | Ahn | H04W 76/14 370/329 |
| 2013/0329629 A1 | 12/2013 | Bao et al. | |
| 2013/0337811 A1 | 12/2013 | Faerber et al. | |
| 2014/0301371 A1 | 10/2014 | Maeda et al. | |

FOREIGN PATENT DOCUMENTS

| | | |
|---|---|---|
| JP | 2011-155399 A | 8/2011 |
| JP | 2011-166595 A | 8/2011 |
| JP | 2012-005091 A | 1/2012 |
| JP | 2012-080367 A | 4/2012 |
| WO | 2009050794 A1 | 4/2009 |
| WO | 2011160924 A1 | 12/2011 |
| WO | 2012/013026 A1 | 2/2012 |
| WO | 2013/065824 A1 | 5/2013 |

OTHER PUBLICATIONS

3GPP TS 36.300 V11.0.0 (Dec. 2011); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11).
LG Electronics Inc.; "Unavailable DeNB cells at phase II"; 3GPP TSG-RAN WG2 #72 R2-106494; Nov. 9, 2010.
Catt; "Key issues based on Alt1 relay"; 3GPP TSG RAN WG3 #75 R3-120104; Jan. 31, 2012.
The extended European search report issued by the European Patent Office dated Feb. 24, 2015, which correspond to European Patent Application No. 13765247.5-1854 and is related to U.S. Appl. No. 14/386,407.
Catt; "Text Proposal on Mobile relay Architecture"; 3GPP TSG-RAN WG3 #75 R3-120105; Feb. 10, 2012.
ZTE; "Mobile relay Architecture Comparison from the Perspective of Handover"; 3GPP TSG-RAN WG3 #75 R3-120026; Feb. 10, 2012.
An Office Action; "Notice of Reasons for Rejection," mailed by the Japanese Patent Office dated Apr. 19, 2016, which corresponds to Japanese Patent Application No. 2014-506282 and is related to U.S. Appl. No. 14/386,407; with English language Concise Explanation.
An Office Action; "Notice of Reasons for Rejection," mailed by the Japanese Patent Office dated Dec. 20, 2016, which corresponds to Japanese Patent Application No. 2015-234059; with English language Concise Explanation.
An Office Action; "Notice of Reasons for Rejection" issued by the Japanese Patent Office dated Jan. 30, 2018, which corresponds to Japanese Patent Application No. 2017-211710 and is related to U.S. Appl. No. 15/469,314; with English language Concise Explanation.

* cited by examiner

FIG. 14

|  | CONTENT | REMARK |
|---|---|---|
| CELL ID | CELL ID OF DeNB | |
| POSITION | POSITION WHERE DeNB IS INSTALLED | LATITUDE AND LONGITUDE |
| CELL DIRECTION | CELL DIRECTION RELATIVE TO POSITION OF DeNB | DIRECTION WHERE THE NORTH IS 0 DEGREE (IN CASE OF SECTOR STATION) |
| CAPACITY | MAXIMUM CONNECTION NUMBER, AND BANDWIDTH OF DeNB | |
| CELL SIZE | SIZE OF SERVICE AREA OF DeNB | TRANSMISSION POWER WOULD BE POSSIBLE |

| NR | TCI | NO REMOVE | NO HO | NO X2 | NO RN |
|---|---|---|---|---|---|
| 1 | TCI#1 | | | | ✓ |
| 2 | TCI#1 | ✓ | | ✓ | |
| 3 | TCI#1 | ✓ | | | ✓ |

IDENTIFY HO REJECTION OF MRN
(DeNB FUNCTION SUPPORT STATE)

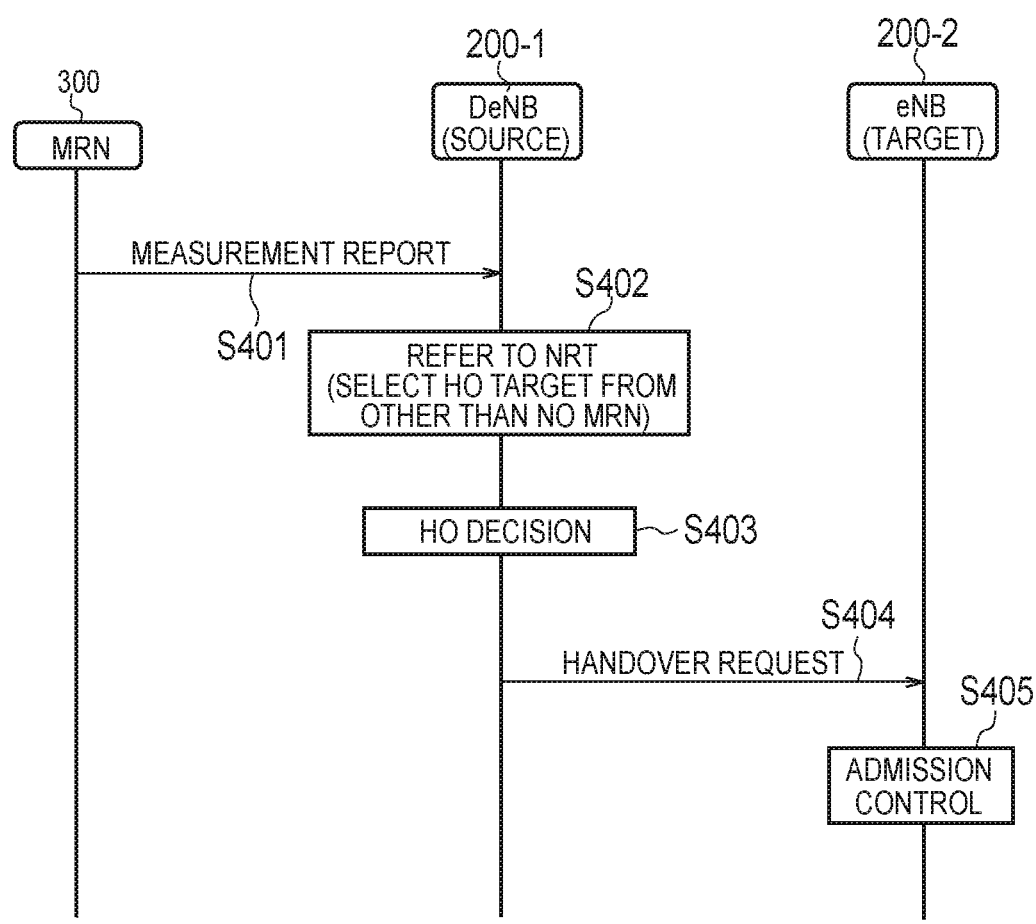

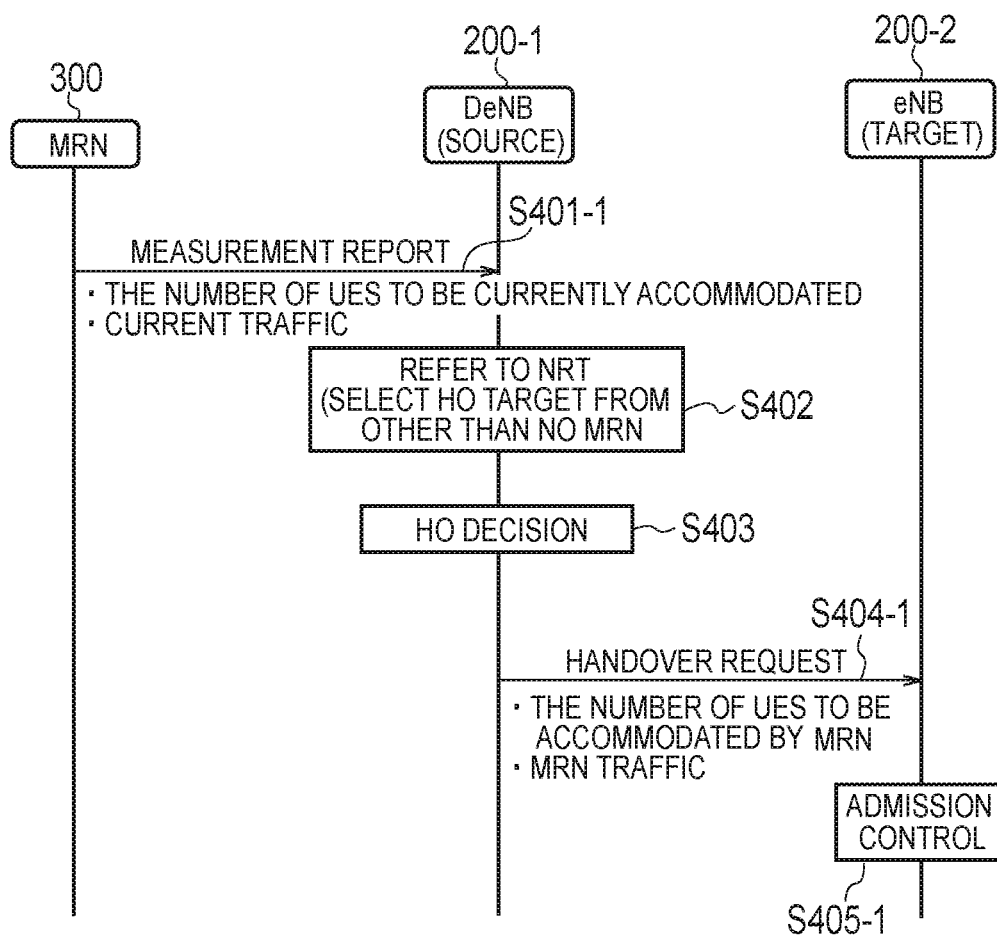

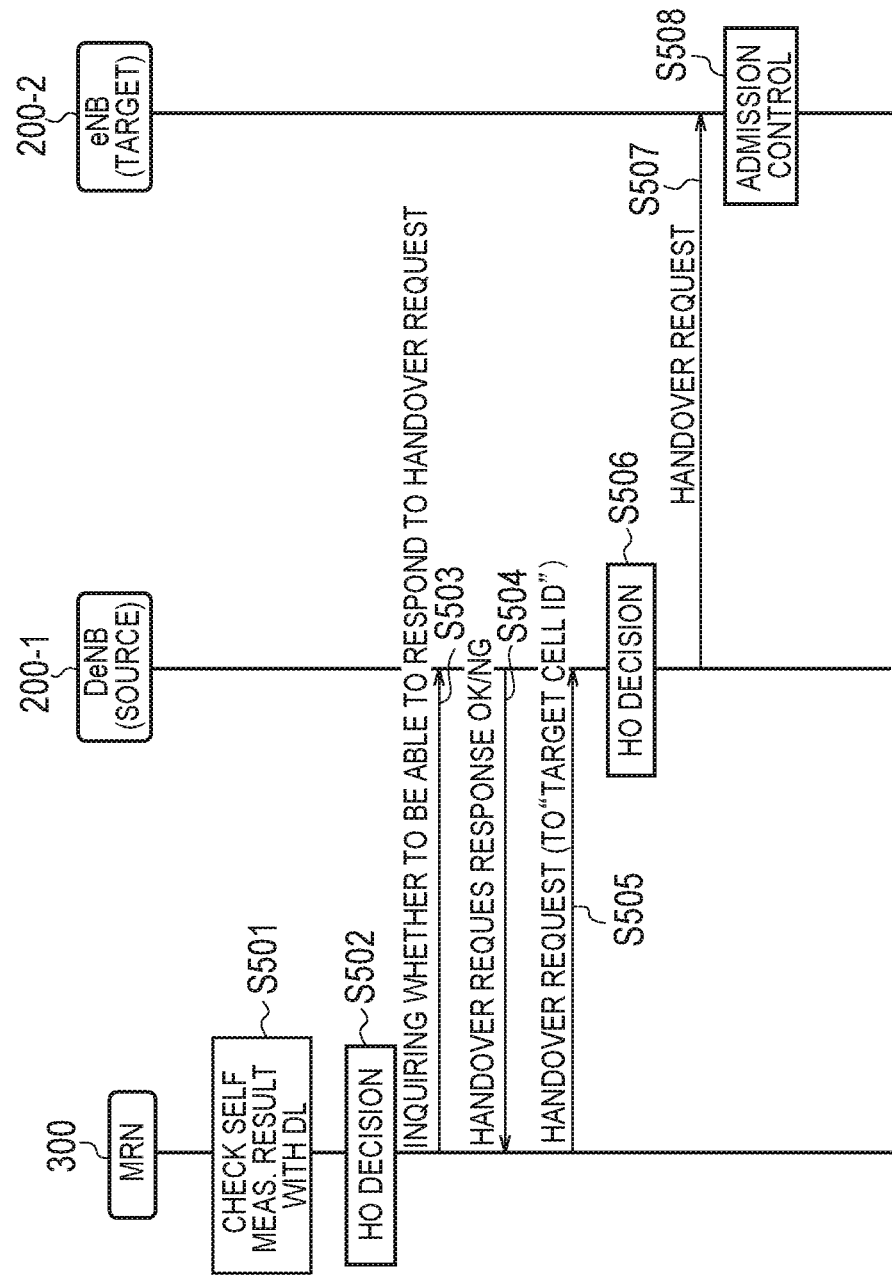

COMMUNICATION CONTROL METHOD

CROSS REFERENCE TO RELATED APPLICATIONS

This application is a Continuation Application of U.S. patent application Ser. No. 15/469,314, filed Mar. 24, 2017, which is a Continuation Application of U.S. patent application Ser. No. 14/386,407, filed Sep. 19, 2014, which is the U. S. National Phase Application of International Application No. PCT/JP2013/058143, filed Mar. 21, 2013, which claims benefit of U.S. Provisional Application Nos. 61/615,045, 61/615,059, 61/615,067, 61/615,073 and 61/615,087, all filed Mar. 23, 2012, the entire contents of which are incorporated herein by reference.

TECHNICAL FIELD

The present disclosure relates to a communication control method in a mobile communication system.

BACKGROUND ART

In 3GPP (3rd Generation Partnership Project) which is a project aiming to standardize a mobile communication system, specifications of a relay station have been designed.

The relay station performs relay transmission between a donor base station and a user terminal (for example, refer to Non Patent Literature 1).

PRIOR ART DOCUMENT

Non-Patent Document

[Non-patent Document 1] 3GPP technology specifications "TS 36.300 V11.0.0" December, 2011

SUMMARY

A method according to the present disclosure, which is applied to a mobile communication system including a first communication apparatus that performs relay transmission between a network and a second communication apparatus, comprises obtaining, by the first communication apparatus, information indicating a function supported by a network apparatus included in the network, and transmitting to the network apparatus, by the first communication apparatus based on the information, a request message for performing the relay transmission.

A first communication apparatus according to the present disclosure, which performs relay transmission between a network and a second communication apparatus, comprises a processor and a memory coupled to the processor. The processor configured to perform processes of obtaining, by the first communication apparatus, information indicating a function supported by a network apparatus included in the network, and transmitting to the network apparatus, by the first communication apparatus based on the information, a request message for performing the relay transmission.

A chipset according to the present disclosure, which is included in a first communication apparatus that performs relay transmission between a network and a second communication apparatus, comprises a processor and a memory coupled to the processor. The processor configured to perform processes of obtaining, by the first communication apparatus, information indicating a function supported by a network apparatus included in the network, and transmitting to the network apparatus, by the first communication apparatus based on the information, a request message for performing the relay transmission.

BRIEF DESCRIPTION OF THE DRAWINGS

FIG. 14 is a configuration diagram of a DeNB list used in an operation pattern 4 according to the second embodiment.
FIG. 18 is a sequence diagram of an operation pattern 1 according to the fourth embodiment.
FIG. 19 is a sequence diagram of an operation pattern 2 according to the fourth embodiment.
FIG. 20 is an operation sequence diagram according to a fifth embodiment.

DESCRIPTION OF EMBODIMENTS

Overview of Embodiment

Figure 1:
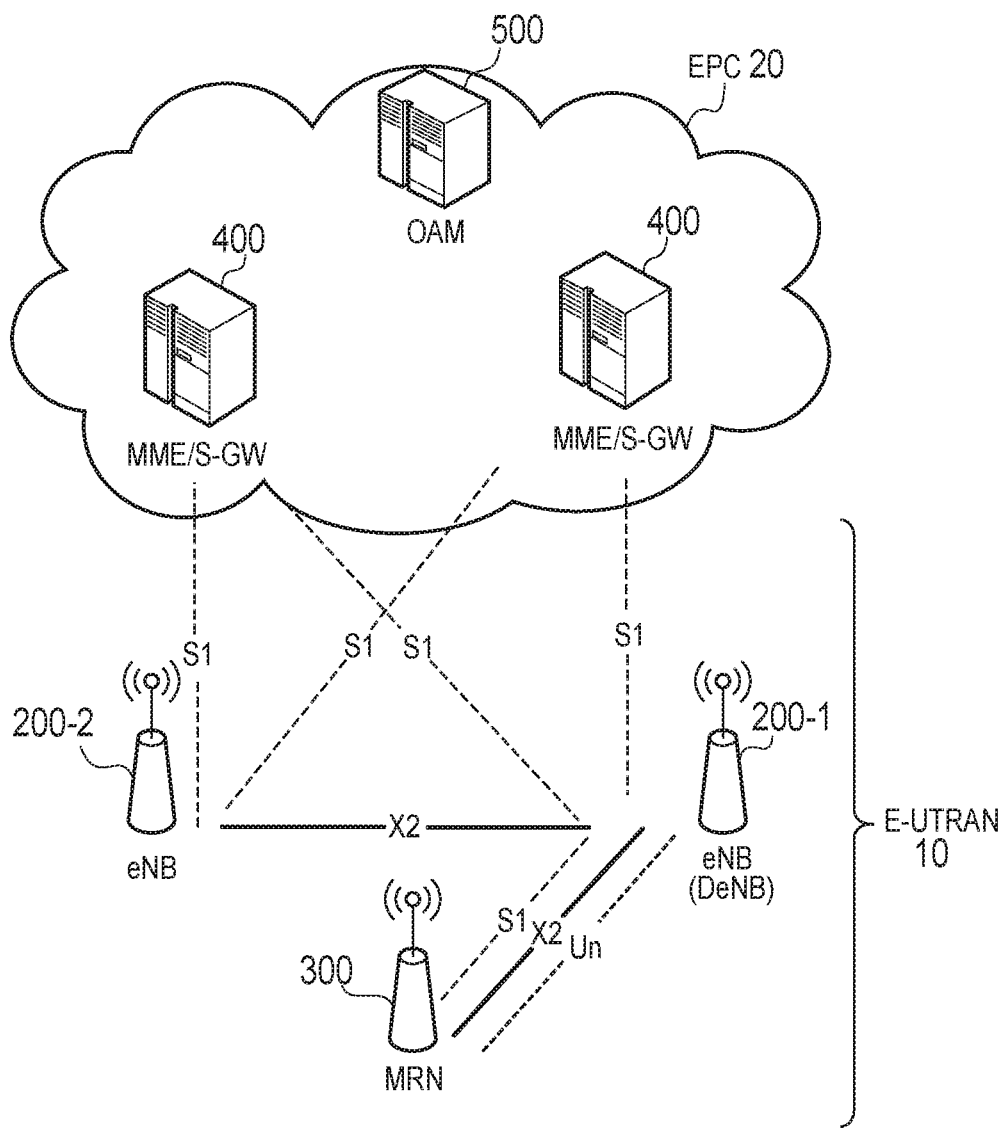
FIG. 1 is a configuration diagram of a mobile communication system.

A communication control method of the first embodiment is a communication control method in a relay station that holds a donor base station list, is connected to a donor base station existing on the donor base station list, and performs relay transmission between the donor base station and a user terminal, and comprises a step A of designating a neighboring base station, a step B of inquiring the neighboring base station designated in the step A of whether to accept or refuse the relay station, and a step C of updating the donor base station list in response to an inquiry result in the step B.

In the first embodiment, the step B may comprise a step B1 of inquiring the neighboring base station designated in the step A of whether the neighboring base station has a donor base station function.

In the first embodiment, the step B may comprise a step B2 of notifying the neighboring base station designated in the step A of a load state of the relay station.

In the first embodiment, the communication control method may further comprise a step D of notifying a core network device of the donor base station list updated in the step C through the donor base station.

A communication control method according to the second and forth embodiments is a communication control method applied to a mobile communication system including a relay station that performs relay transmission between a donor base station and a user terminal, and comprises a step A of, in a handover procedure of the relay station to a target base station, transmitting a handover request for requesting to accept the relay station, to the target base station, wherein in the step A, information indicating a load state of the relay station is transmitted, together with the handover request.

In the second embodiment, when the handover to the target base station is determined at the relay station, in the step A, the relay station may transmit the information indicating the load state of the relay station, together with the handover request.

In the second embodiment, the communication control method may further comprise a step C of determining, by the relay station, prior to the step A, the target base station, on the basis of a donor base station list that is a list of base stations of a donor base station candidate or a neighboring base station list that is a list of neighboring base stations, wherein the donor base station list or the neighboring base station list includes information on at least one of: a position, a cell direction, a capacity, and a cell size, regarding each of the base stations of a donor base station candidate or the neighboring base stations.

In the fourth embodiment, when the handover to the target base station is determined at the donor base station, in the step A, the donor base station may transmit the information indicating the load state of the relay station, together with the handover request.

A communication control method according to the third embodiment is a communication control method in a mobile communication system including a relay station that holds a donor base station list, is connected to a donor base station existing on the donor base station list, and performs relay transmission between the donor base station and a user terminal, and comprises a step A of obtaining, by the relay station, when it is not possible to perform a handover of the relay station to the base station existing on the donor base station list, a donor base station list held by another relay station connected to a predetermined base station, from the other relay station.

In the third embodiment, the communication control method may further comprise a step C of receiving, by the relay station, prior to the step A, relay station information that is information on another relay station connected to the predetermined base station, from the predetermined base station.

In the third embodiment, the communication control method further comprises a step D of transmitting a handover request from the relay station to a target base station; and a step E of transmitting, by the target base station, a handover rejection response to the relay station, when rejecting the handover request, wherein the predetermined base station is the target base station, in the step E, the target base station transmits the handover rejection response including the relay station information, and in the step C, the relay station may receive the relay station information included in the handover rejection response.

In the third embodiment, the communication control method may further comprise a step D of inquiring, prior to the step C, the predetermined base station of another relay station connected to the predetermined base station.

A communication control method according to the fourth embodiment is a communication control method applied to a mobile communication system including a base station that has a donor base station function and a relay station that performs relay transmission between the base station and a user terminal, and comprises: a step A of, by the base station, holding a neighboring base station list including an identifier of a neighboring base station, wherein the neighboring base station list further includes information indicating whether or not the neighboring base station has a donor base station function, regarding each of the neighboring base stations.

In the fourth embodiment, the communication control method further comprises: a step B of requesting, by the base station, information for updating the neighboring base station list, to a core network device, when the relay station is connected to the base station, and a step C of updating, by the base station, the neighboring base station list in response to the information from the core network device.

In the fourth embodiment, the communication control method further comprises: a step D of receiving, by the target base station, a handover request from the base station in a handover procedure of the relay station from the base station to the target base station, and a step E of transmitting, by the target base station, information indicating that the target base station does not have the donor base station function, together with a rejection response to the handover request, to the base station when the target base station does not have the donor base station function.

A communication control method according to the second and fifth embodiments is a communication control method applied to a mobile communication system in which a handover of a user terminal connected to a base station is determined by the base station, and comprises: a step A of performing a handover determination of a relay station that is connected to a donor base station and performs relay transmission between the donor base station and a user terminal, wherein in the step A, the handover determination of the relay station is performed by the relay station.

In the second and fifth embodiments, the communication control method further comprises a step B of transmitting, by the relay station, a handover request for requesting to accept the relay station, when, as a result of the step A, determining that the handover to the target base station is performed.

In the second embodiment, the step B includes a step B1 of transmitting, by the relay station, the handover request to the target base station, by using a network interface established between the relay station and the target base station.

In the second embodiment, the communication control method further comprises: a step C of requesting, by the target base station, information for the handover of the relay station, to the donor base station, in response to reception of the handover request from the relay station; and a step D of transmitting, by the donor base station, the information for the handover of the relay station, to the target base station, in response to the request from the target base station.

In the second embodiment, the communication control method further comprises a step E of transmitting, by the target base station, a handover permission response including the information for the handover of the relay station, to the relay station, by using the network interface, after receiving the information for the handover of the relay station, from the donor base station.

In the second embodiment, in the step B, the relay station transmits the handover request to the donor base station, after including one or a plurality of identifiers of the target base station in the handover request.

In the second and fifth embodiments, the communication control method further comprises, a step of inquiring, prior to the step B, by the relay station, the donor base station and/or the target base station of whether or not possible to respond to a handover request from the relay station.

(1) First Embodiment

In the present embodiment, an example of a mobile communication system configured on the basis of 3GPP standards (that is, LIE-Advanced) after release 10 will be described.

(1.1) Overview of the Mobile Communications System

FIG. 1 is a configuration diagram of a mobile communication system according to the present embodiment. As illustrated in FIG. 1, the mobile communication system includes a user terminal (UE: User Equipment) 100, a base station (eNB: evolved Node-B) 200, a movable relay station (MRN: Mobile Relay Node) 300, a mobility management device (MME: Mobility Management Entity)/a gateway device (S-GW: Serving Gateway) 400, and an operation and maintenance device (OAM: Operation and Maintenance) 500.

The eNB 200 and the MRN 300 are network devices included in a radio access network (E-UTRAN: Evolved-UMTS Terrestrial Radio Access Network) 10. The MME/S-GW 400 and the OAM 500 are network devices included in a core network (EPC: Evolved Packet Core) 20.

The UE 100 is a movable radio communication device owned by a user. The UE 100 performs radio communication with a cell (called a "serving cell"), with which a connection is established, in a connected state corresponding to a state during communication.

In addition, the "cell" is used as a term indicating a minimum unit of a radio communication area, and is also used as a function of performing radio communication with the UE 100. Thus, the eNB 200 is also called a cell.

When the UE 100 moves together with the movement of a user, a change in the serving cell of the UE 100 is necessary. An operation, in which the UE 100 changes the serving cell in a connected state, is called "handover". A series of procedures of the handover are called a "handover procedure". The handover procedure includes a handover preparation step (Preparation), a handover execution step (Execution), and a handover completion step (Completion).

In the handover procedure, a cell of a handover source is called a "source cell" and a cell of a handover destination is called a "target cell". Furthermore, in the handover procedure from a certain eNB 200 (a cell) to another eNB 200 (a cell), an eNB 200 of a handover source is called a "source eNB" and an eNB 200 of a handover destination is called a "target eNB".

The eNB 200 is a stationary radio communication device installed by a communication provider, and for example, is a macro base station (MeNB) or a pico base station (PeNB). Alternatively, the eNB 200 may be a home base station (HeNB) installable within the house. The eNB 200 forms a cell. The eNB 200 performs radio communication with the UE 100.

The eNB 200 has a decision right of handover for the UE 100 subordinate to the eNB 200. Specifically, the eNB 200 determines whether to perform handover from a serving cell to another cell on the basis of a measurement report from the UE 100. The eNB 200 holds a list (hereinafter, a "neighboring eNB list") of neighboring eNBs (neighboring cells) in order to control the handover of the UE 100.

When the eNB 200 has a donor base station (DeNB) function, the eNB 200 is able to establish a connection to the MRN 300 and to operate as a donor of the MRN 300. For example, an eNB 200 supporting a release after 3GPP release 10 has the DeNB function as an option function, but an eNB 200 supporting a release before the 3GPP release 10 does not have the DeNB function. Alternatively, an eNB 200 (HeNB) with low processing capability may not have the DeNB function.

The eNB 200 communicates with the EPC 20 (MME/S-GW 400) through an S1 interface that is a logical communication channel between the eNB 200 and the EPC 20. Furthermore, the S1 interface is also established between the MRN 300 and the eNB 200 (DeNB 200-1) operating as the donor of the MRN 300. The MRN 300 is able to communicate with the EPC 20 through the S1 interface via the DeNB 200-1.

The MME is provided corresponding to a control plane dealing with control information, and performs various types of mobility management or verification processes for the UE 100. The S-GW is provided corresponding to a user plane dealing with user data, and performs forwarding control and the like of user data transmitted/received by the UE 100.

The eNB 200 communicates with a neighboring eNB 200 through an X2 interface that is a logical communication channel between the eNB 200 and the neighboring eNB 200. Furthermore, the X2 interface is also established between the MRN 300 and the eNB 200 (DeNB 200-1) operating as the donor of the MRN 300. The MRN 300 is able to communicate with a neighboring eNB 200-2 through the X2 interface via the DeNB 200-1.

In the present embodiment, the S1 interface and/or the X2 interface correspond to a network interface.

The MRN 300 is a movable radio communication device installed in a moving body such as a train or a bus. The MRN 300 holds a list (hereinafter, a "DeNB list") of eNBs 200 (cells) available as DeNBs. The MRN 300 acquires the DeNB list from the OAM 500 at the time of starting of the MRN 300.

The MRN 300 establishes (Connect) a connection to an eNB 200 existing on the DeNB list, and performs radio communication with the eNB 200 (the DeNB 200-1) with which a connection is established. Then, the MRN 300 performs relay transmission between the UE 100 subordinate to the MRN 300 and the DeNB 200-1.

Basically, the MRN 300 is equal to the UE 100 in terms of the DeNB 200-1 and is equal to the eNB 200 in terms of the UE 100. That is, the MRN 300 has both a characteristic of the UE 100 and a characteristic of the eNB 200.

When the MRN 300 moves together with the movement of a movable body, it is necessary for the MRN 300 to be transitioned (Disconnect) from a connected state to an idle state and then to establish (Connect) a connection to a new DeNB, or to establish (that is, handover) a connection to the new DeNB while maintaining the connected state. In the present embodiment, the former case (Connect/Disconnect) is considered and the latter case (handover) will be described after the second embodiment.

The MRN 300 has a decision right of handover for the UE 100 subordinate to the MRN 300. Specifically, the MRN 300 determines whether to perform handover from a serving cell to another cell on the basis of the measurement report (Measurement Report) from the UE 100. The eNB 200 holds the neighboring eNB list in order to control the handover of the UE 100.

Figure 2:
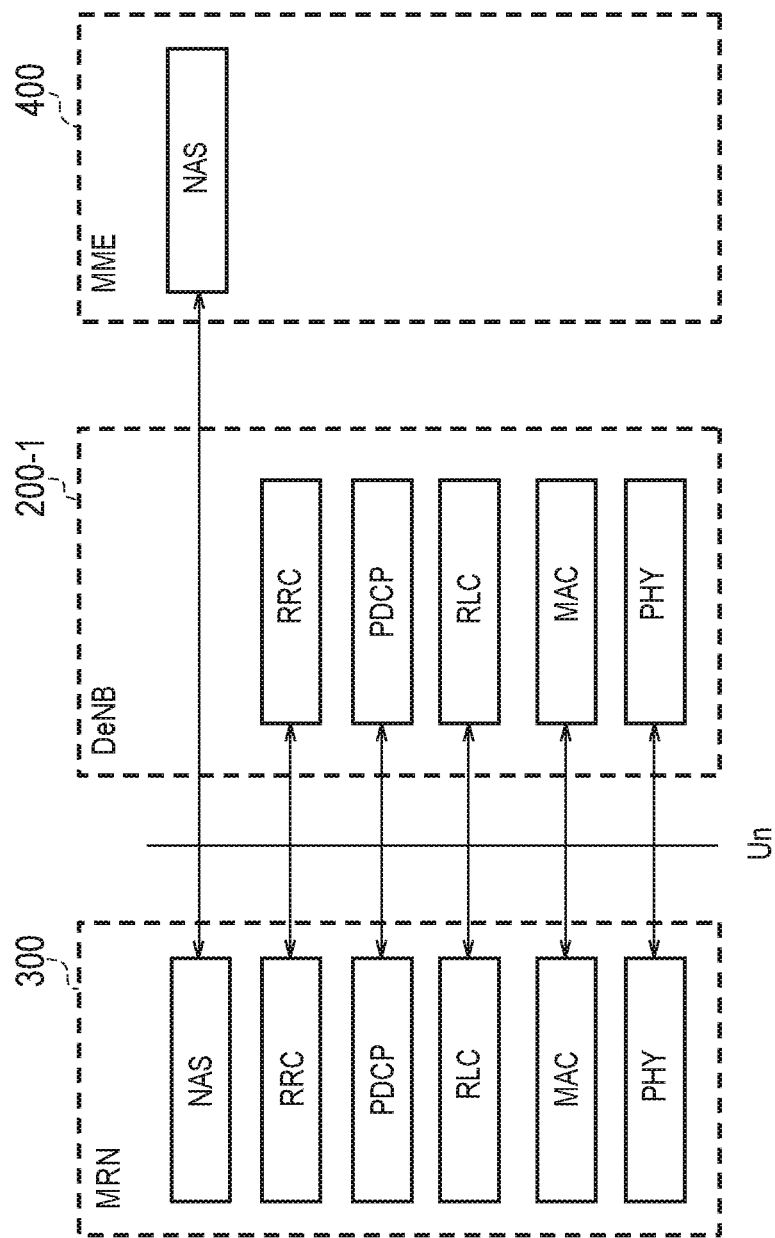
FIG. 2 is a protocol stack diagram of a Un interface.

Next, a protocol stack associated with the MRN 300 will be described. FIG. 2 is a protocol stack diagram of a Un interface.

As illustrated in FIG. 2, in the protocol stack of the Un interface, a layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs data coding/decoding, modulation/demodulation, antenna mapping/demapping, and resource mapping/demapping. The PHY layer provides a transmission service to an upper layer using a physical channel. Between a physical layer of the MRN 300 and a physical layer of the DeNB 200-1, data is transmitted through a physical channel. The PHY layer is connected to the MAC layer through a transport channel.

The MAC layer performs preferential control of data, and a retransmission process and the like by hybrid ARQ (HARQ). Between a MAC layer of the MRN 300 and a MAC layer of the DeNB 200-1, data is transmitted through a transport channel. The MAC layer of the DeNB 200-1 includes MAC scheduler for decision of transport formats and resource blocks of an uplink and a downlink. The transport format includes a transport block size, a modulation/coding scheme (MCS), and antenna mapping.

The RLC layer transmits data to an RLC layer of a reception side using the functions of the MAC layer and the PHY layer. Between an RLC layer of the MRN 300 and an RLC layer of the DeNB 200-1, data is transmitted through a logical channel.

The PDCP layer performs header compression/extension and encryption/decryption.

The RRC layer is defined only in a control plane. Between an RRC layer of the MRN 300 and an RRC layer of the DeNB 200-1, data is transmitted through a radio bearer. The RRC layer controls the logical channel, the transport channel, and the physical channel in response to establishment, re-establishment, and release of the radio bearer. When there is an RRC connection between the RRC of the MRN 300 and the RRC of the DeNB 200-1, the MRN 300 is in a "connected state", and otherwise, the MRN 300 is in an "idle state".

A NAS (Non-Access Stratum) layer positioned above the RRC layer is provided in the MRN 300 and the MME 300 to perform session management, mobility management and the like.

Figure 3:
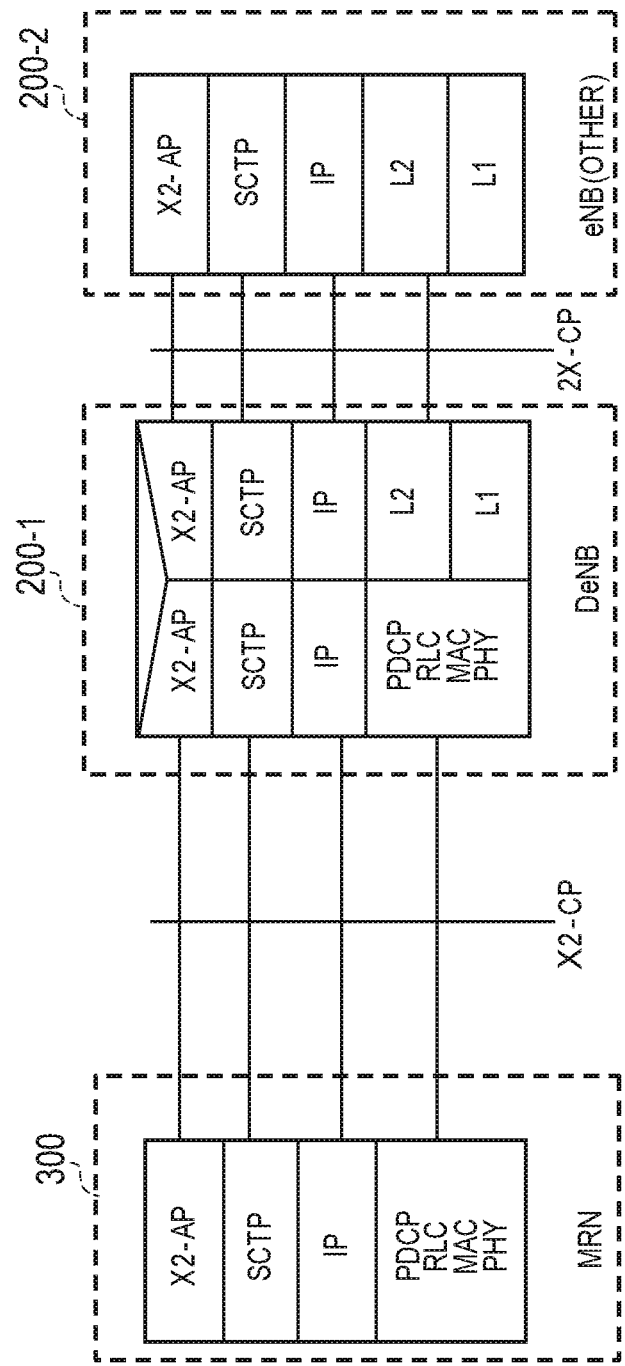
FIG. 3 is a protocol stack diagram of an X2 interface.

FIG. 3 is a protocol stack diagram for the X2 interface established between the MRN 300 and the neighboring eNB 200-2. Hereinafter, a control plane will be described.

As illustrated in FIG. 3, IP (Internet Protocol) and SCTP (Stream. Control Transmission Protocol) are provided on a layer 1 (L1) and a layer 2 (L2), and X2-AP (X2 Application Protocol) is provided on the SCTP. The X2-AP transmits and receives a message according to handover and the like.

An X2 message transmitted by the MRN 300 may be relayed by the DeNB 200-1 and transmitted to the neighboring eNB 200-2. Furthermore, an X2 message transmitted by the neighboring eNB 200-2 may be relayed by the DeNB 200-1 and transmitted to the MRN 300.

L1 and L2 between the MME 300 and the DeNB 200-1 are equal to L1 and L2 of the Un interface.

Figure 4:
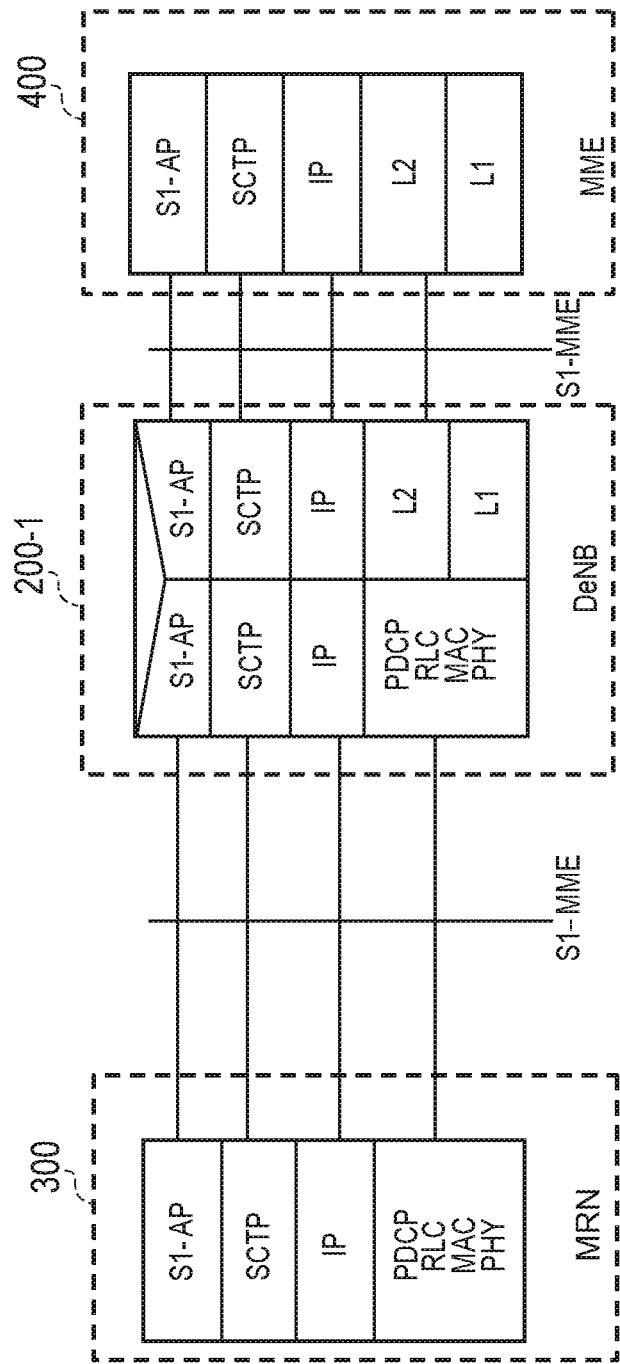
FIG. 4 is a protocol stack diagram of an S1 interface.

FIG. 4 is a protocol stack diagram for the S1 interface established between the MRN 300 and the MME 400. As illustrated in FIG. 4, the S1 interface is different from the X2 interface in that S1-AP is provided instead of the X2-AP.

Figure 5:
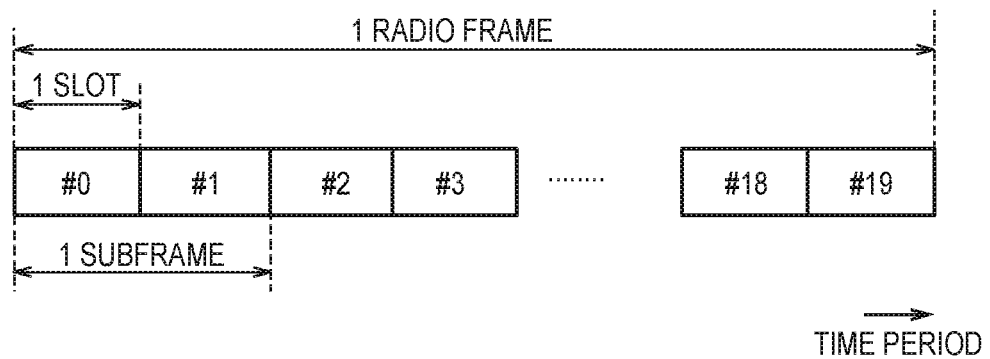
FIG. 5 is a configuration diagram of a radio frame.

FIG. 5 is a configuration diagram of a radio frame used in the mobile communication system (an LTE system) according to the present embodiment. The LTE system employs OFDMA (Orthogonal Frequency Division Multiplexing Access) in a downlink and SC-FDMA (Single Carrier Frequency Division Multiple Access) in an uplink.

As illustrated in FIG. 5, the radio frame includes 10 subframes arranged in a time-period direction, wherein each subframe includes two slots arranged in the time-period direction. Each subframe has a length of 1 ms and each slot has a length of 0.5 ms. Each subframe includes a plurality of resource blocks (RBs) in a frequency direction, and a plurality of symbols in the time-period direction. Each symbol is provided at a head thereof with a guard interval called a cyclic prefix (CP).

In the downlink, an interval of several symbols at the head of each subframe is a control region mainly used as a physical downlink control channel (PDCCH). Furthermore, the other interval of each subframe is a data region mainly used as a physical downlink shared channel (PDSCH). In the downlink, reference signals (RS) different from each other in each cell are transmitted.

In the uplink, both end portions in the frequency direction of each subframe are control regions mainly used as a physical uplink control channel (PUCCH). Furthermore, the center portion in the frequency direction of each subframe is a data region mainly used as a physical uplink shared channel (PUSCH).

The radio frame includes a plurality of MBSFN (MBMS Single Frequency Network) subframes. The MRN 300 communicates with the DeNB 200-1 using the MBSFN subframes.

(1.2) Block Configuration

Hereinafter, the block configurations of the UE 100, the eNB 200, and the MRN 300 will be described.

Figure 6:
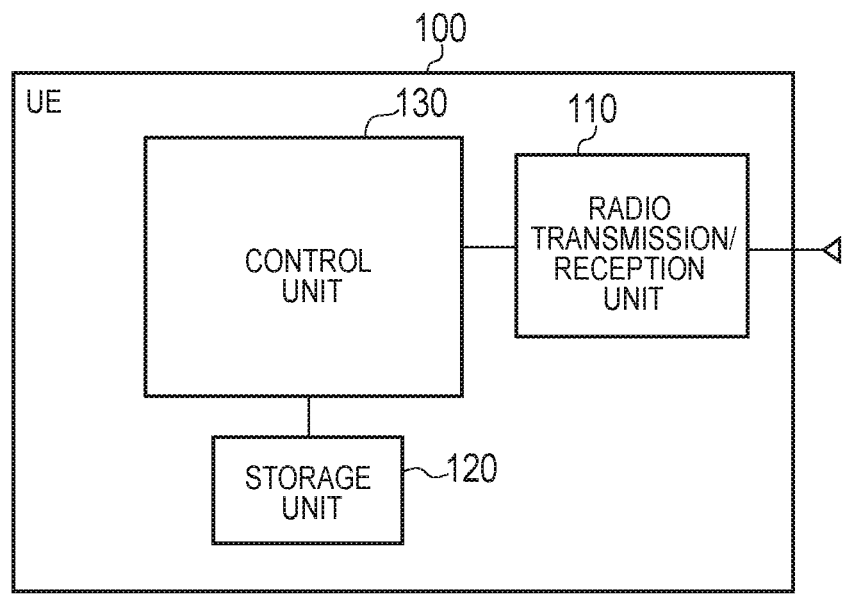
FIG. 6 is a block diagram of UE.

FIG. 6 is a block diagram of the UE 100. As illustrated in FIG. 6, the UE 100 includes a radio transmission/reception unit 110, a storage unit 120, and a control unit 130.

The radio transmission/reception unit 110 transmits/receives a radio signal.

The storage unit 120 stores various types of information that is used for the control by the control unit 130.

The control unit 130 controls various functions of the UE 100. For example, the control unit 130 controls the aforementioned operations of the UE 100.

Figure 7:
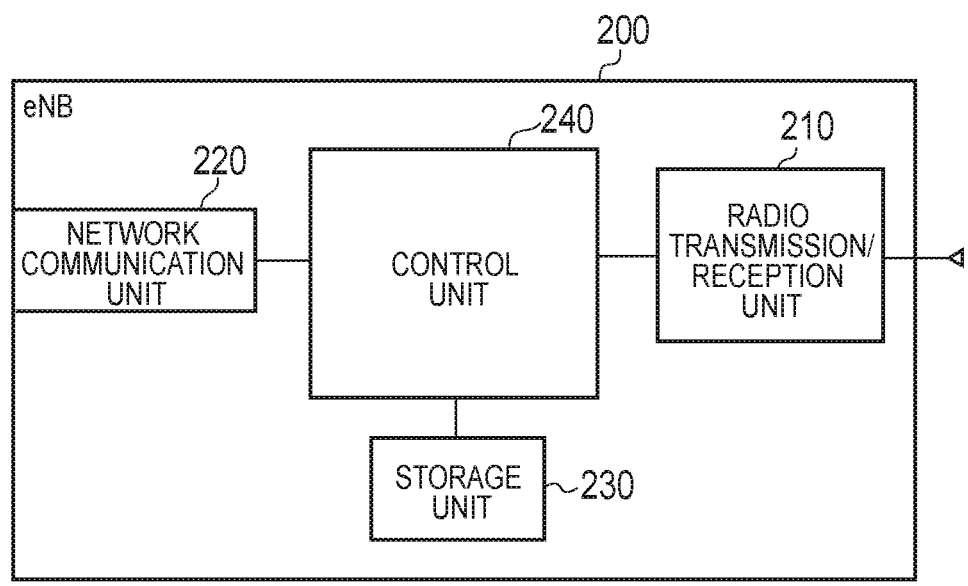
FIG. 7 is a block diagram of eNB.

FIG. 7 is a block diagram of the eNB 200. As illustrated in FIG. 7, the eNB 200 includes a radio transmission/reception unit 210, a network communication unit 220, a storage unit 230, and a control unit 240.

The radio transmission/reception unit 210 transmits/receives a radio signal. Furthermore, the radio transmission/reception unit 210 forms a cell.

The network communication unit 220 communicates with the MME/S-GW 400 through the S1 interface. The network communication unit 220 communicates with the neighboring eNB 200 through the X2 interface.

The storage unit 230 stores various types of information that is used for the control by the control unit 240. Furthermore, the storage unit 230 stores (holds) the neighboring eNB list.

The control unit 240 controls various functions of the eNB 200. For example, the control unit 240 controls the aforementioned operations of the eNB 200 and operations of the eNB 200 which will be described later.

Figure 8:
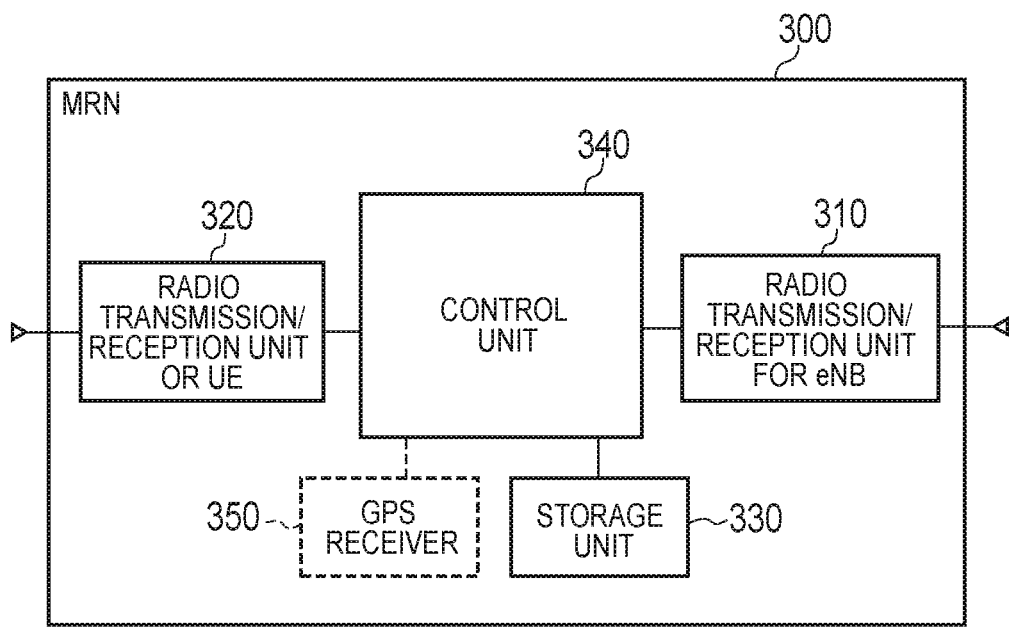
FIG. 8 is a block diagram of MRN.

FIG. 8 is a block diagram of the MRN 300. As illustrated in FIG. 8, the MRN 300 includes a radio transmission/reception unit 310 for eNB, a radio transmission/reception unit 320 for UE, a storage unit 330, and a control unit 340.

The radio transmission/reception unit 310 for eNB receives a radio signal from the eNB 200 and transmits a radio signal to the eNB 200.

The radio transmission/reception unit 320 for UE receives a radio signal from the UE 100 and transmits a radio signal to the UE 100. The radio transmission/reception unit 320 for UE forms a cell.

The storage unit 330 stores various types of information that is used for the control by the control unit 340. Furthermore, the storage unit 330 stores (holds) the neighboring eNB list for controlling the handover of the UE 100, and the DeNB list for deciding DeNB with which the MRN 300 should establish a connection.

The control unit 340 controls various functions of the MRN 300. For example, the control unit 340 controls the aforementioned operations of the MRN 300 and operations of the MRN 300 which will be described later. The control unit 340 is able to decide a DeNB candidate in the DeNB list as DeNB by measuring the radio signal (a reference signal) received in the radio transmission/reception unit 310 for eNB.

Furthermore, the MRN 300 may have a positioning system (for example, a GPS receiver 350) for acquiring its own location information. The MRN 300 is able to estimate its own movement speed on the basis of its own location information.

(1.3) Operation According to First Embodiment

Hereinafter, the operation of the mobile communication system according to the present embodiment will be described.

In the following operation patterns 1 to 3, the MRN 300, which holds the DeNB list, is connected to the DeNB 200-1 existing on the DeNB list, and performs relay transmission between the DeNB 200-1 and the UE 100, designates a neighboring eNB 200, inquires the designated neighboring eNB 200 whether to accept or refuse the MRN 300, and updates the DeNB list in response to an inquiry result.

Specifically, in the following operation patterns 1 and 2, the MRN 300 designates a neighboring eNB 200 not existing on the DeNB list. When the inquiry result for the designated neighboring eNB 200 indicates permission of the acceptance of the MRN 300, the MRN 300 updates the DeNB list such that the designated neighboring eNB 200 is added.

On the other hand, in the following operation pattern 3, the MRN 300 designates a neighboring eNB 200 existing on the DeNB list. When the inquiry result for the designated neighboring eNB 200 indicates refusal of the acceptance of the MRN 300, the MRN 300 updates the DeNB list such that the designated neighboring eNB 200 is invalid (excluded).

(1.3.1) Operation Pattern 1

Figure 9:
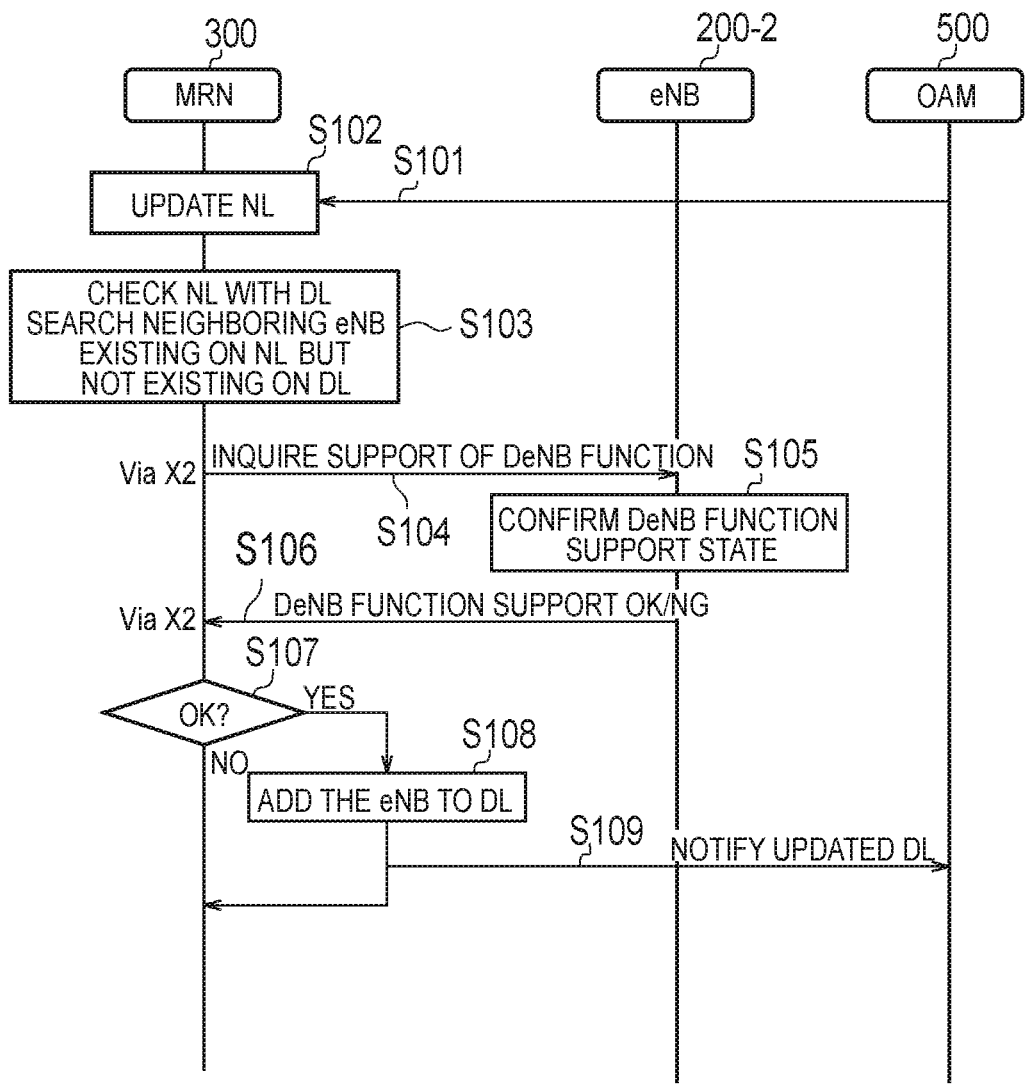
FIG. 9 is a sequence diagram of an operation pattern 1 according to a first embodiment.

FIG. 9 is a sequence diagram of an operation pattern 1 according to the present embodiment.

As illustrated in FIG. 9, in step S101, the OAM 500 notifies the MRN 300 of the neighboring eNB list (NL) for controlling the handover of the UE 100 via the DeNB 200-1. As well as the whole of the neighboring eNB list, only a part of the changed neighboring eNB list may be notified.

In step S102, the MRN 300 updates a held neighboring eNB list (NL) by the neighboring eNB list received from the OAM 500.

In step S103, the MRN 300 compares the neighboring eNB list updated in step S102 with the held neighboring eNB list. Specifically, the MRN 300 searches for a neighboring eNB existing on the neighboring eNB list and not existing on the DeNB list.

Hereinafter, a description will be given on the assumption that the eNB 200-2 is designated as the neighboring eNB existing on the neighboring eNB list and not existing on the DeNB list.

In step S104, the MRN 300 inquires the eNB 200-2 designated in step S103 of whether the eNB 200-2 has a DeNB function through the X2 interface.

In step S105, the eNB 200-2 confirms whether the eNB 200-2 has the DeNB function in response to the inquiry from the MRN 300.

In step S106, the eNB 200-2 notifies the MRN 300 of whether the eNB 200-2 has the DeNB function through the X2 interface.

In step S107, the MRN 300 confirms whether the eNB 200-2 has the DeNB function.

When the eNB 200-2 has the DeNB function (step S107; Yes), the MRN 300 updates the DeNB list such that the eNB 200-2 is added in step S108. Specifically, the MRN 300 adds an identifier (a cell ID) of the eNB 200-2 to the DeNB list.

In step S109, the MRN 300 notifies the OAM 500 of the DeNB list updated in step S108 via the DeNB 200-1. As well as the whole of the updated DeNB list, only a part of the updated DeNB list may be notified.

In addition, in the present case, the description was provided for the case of starting the operation for updating the DeNB list by using the update of the neighboring eNB list as a trigger. However, instead of such a method, the following method may be employed.

In the situation in which the MRN 300 stops, the necessity of updating the DeNB list is low. Therefore, it may be possible to start the operation for updating the DeNB list by using the generation of a trigger of a measurement report (Measurement Report) in the MRN 300 as a trigger. Alternatively, the operation may be regularly performed in a period in which a movement speed of the MRN 300 exceeds a threshold value.

Furthermore, by using, as a trigger, the fact that a neighboring cell (a neighboring eNB) detected by measuring a received reference signal is not included in the DeNB list or a neighboring cell (a neighboring eNB) with the highest reference signal received power (RSRP) through the measurement of the received reference signal is not included in the DeNB list, the MRN 300 may start the operation for updating the DeNB list and inquire the neighboring cell (the neighboring eNB).

(1.3.2) Operation Pattern 2

Figure 10:
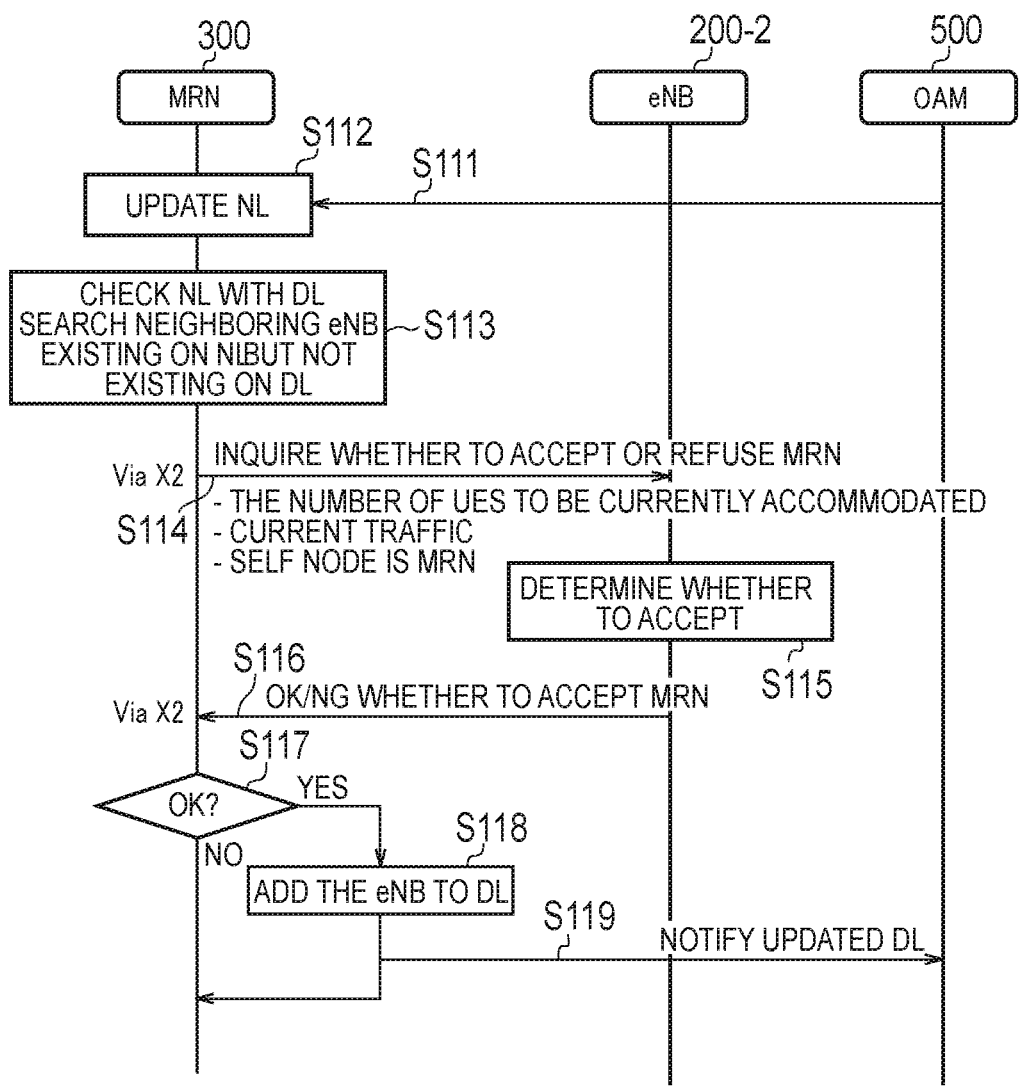
FIG. 10 is a sequence diagram of an operation pattern 2 according to the first embodiment.

FIG. 10 is a sequence diagram of an operation pattern 2 according to the present embodiment.

As illustrated in FIG. 10, in step S111, the OAM 500 notifies the MRN 300 of the neighboring eNB list for controlling the handover of the UE 100 via the DeNB 200-1. As well as the whole of the neighboring eNB list, only a part of the changed neighboring eNB list may be notified.

In step S112, the MRN 300 updates a held neighboring eNB list by the neighboring eNB list received from the OAM 500.

In step S113, the MRN 300 compares the neighboring eNB list updated in step S112 with the held neighboring eNB list. Specifically, the MRN 300 searches for a neighboring eNB existing on the neighboring eNB list and not existing on the DeNB list.

Hereinafter, a description will be given on the assumption that the eNB 200-2 is designated as the neighboring eNB existing on the neighboring eNB list and not existing on the DeNB list.

The MRN 300 recognizes its own load state. The load state includes the number of UEs 100 accommodated by the MRN 300 (specifically, the number of UEs 100 being connected to the MRN 300), the amount of traffic dealt by the MRN 300, or the like. In addition, as well as an actual load state, a potential load state (for example, processing capability such as the maximum number of UEs 100 that may be accommodated or the maximum amount of traffic) may be recognized.

In step S114, the MRN 300 notifies the eNB 200-2 designated in step S113 of the load state through the X2 interface and inquires the eNB 200-2 of whether to accept or refuse the MRN 300. At this time, it may be possible also for the MRN 300 to notify that it is the "MRN" that performed the inquiry.

In step S115, the eNB 200-2 determines the acceptance or refusal of the MRN 300 in response to the inquiry from the MRN 300. Specifically, the eNB 200-2 compares a margin based on its own load state with the load state of the MRN 300, and determines whether a problem does not occur after a connection to the MRN 300 is established.

In step S116, the eNB 200-2 notifies the MRN 300 of the acceptance or refusal of the MRN 300 through the X2 interface.

In step S117, the MRN 300 confirms whether an inquiry result for the eNB 200-2 is "acceptance permission" or "acceptance refusal".

In the case of the "acceptance permission" (step S117; Yes), the MRN 300 updates the DeNB list such that the eNB 200-2 is added in step S118. Specifically, the MRN 300 adds an identifier (a cell ID) of the eNB 200-2 to the DeNB list.

In step S119, the MRN 300 notifies the OAM 500 of the DeNB list updated in step S118 via the DeNB 200-1. As well as the whole of the updated DeNB list, only a part of the updated DeNB list may be notified.

In addition, in the present case, the description was provided for the case of starting the operation for updating the DeNB list by using the update of the neighboring eNB list as a trigger. However, another method described in the operation pattern 1 may be employed.

(1.3.3) Operation Pattern 3

Figure 11:
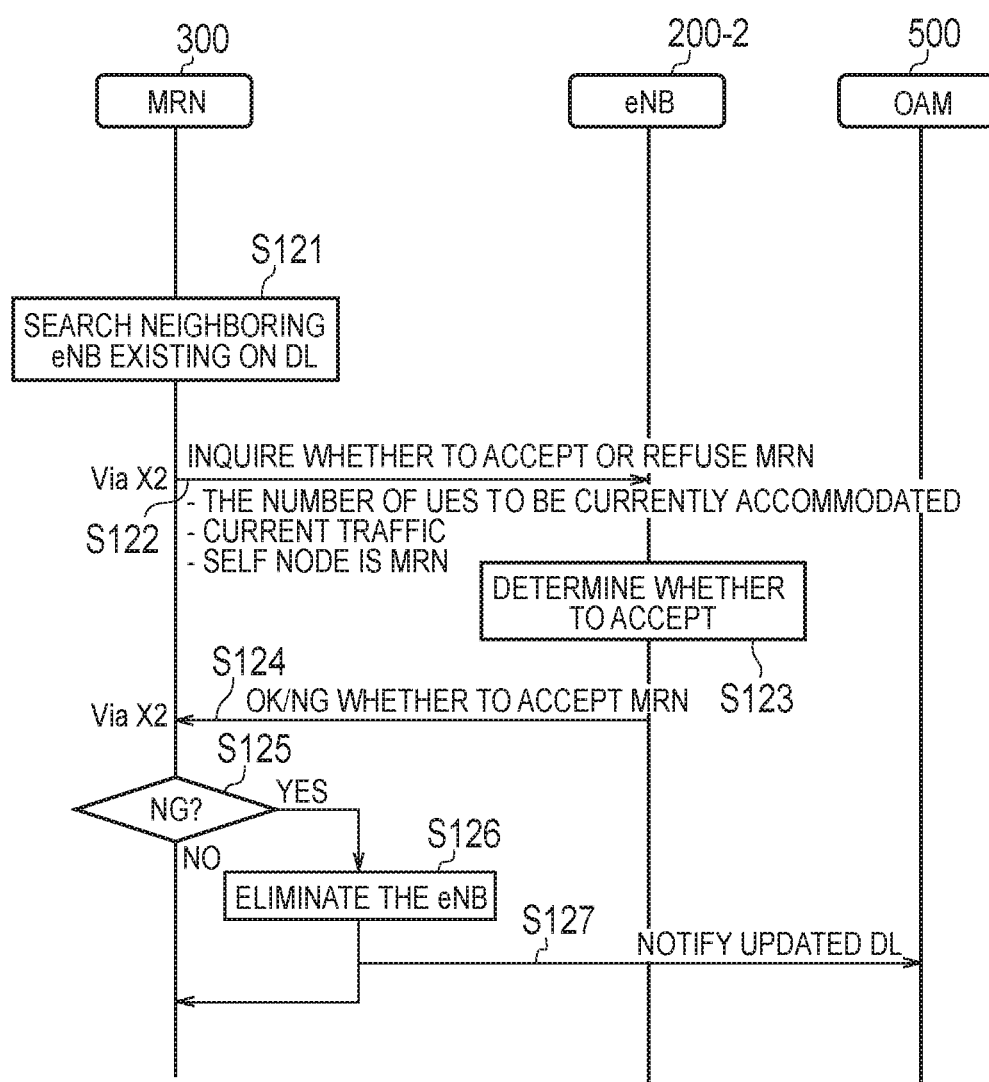
FIG. 11 is a sequence diagram of an operation pattern 3 according to the first embodiment.

FIG. 11 is a sequence diagram of an operation pattern 3 according to the present embodiment.

As illustrated in FIG. 11, in step S121, the MRN 300, for example, searches for a neighboring eNB existing on the neighboring eNB list by using a large change in its own load state as a trigger. Hereinafter, a description will be given on the assumption that the eNB 200-2 is designated as the neighboring eNB existing on the neighboring eNB list.

The MRN 300 recognizes its own load state. The load state is the number of UEs 100 accommodated by the MRN 300 (specifically, the number of UEs 100 being connected to the MRN 300), the amount of traffic dealt by the MRN 300, or the like.

In step S122, the MRN 300 notifies the eNB 200-2 designated in step S121 of the load state through the X2 interface and inquires the eNB 200-2 of whether to accept or refuse the MRN 300. At this time, it may be possible also for the MRN 300 to notify that it is the "MRN" that performed the inquiry.

In step S123, the eNB 200-2 determines the acceptance or refusal of the MRN 300 in response to the inquiry from the MRN 300. Specifically, the eNB 200-2 compares a margin based on its own load state with the load state of the MRN 300, and determines whether a problem does not occur after a connection to the MRN 300 is established.

In step S124, the eNB 200-2 notifies the MRN 300 of the acceptance or refusal of the MRN 300 through the X2 interface.

In step S125, the MRN 300 confirms whether an inquiry result for the eNB 200-2 is "acceptance permission" or "acceptance refusal".

In the case of the "acceptance refusal" (step S125; Yes), the MRN 300 updates the DeNB list such that the eNB 200-2 is invalid in step S126. Specifically, the MRN 300 excludes an identifier (a cell ID) of the eNB 200-2 from the DeNB list, or sets the eNB 200-2 to be temporarily invalid.

In step S127, the MRN 300 notifies the OAM 500 of the DeNB list updated in step S126 via the DeNB 200-1. As well as the whole of the updated DeNB list, only a part of the updated DeNB list may be notified.

In addition, in the present case, the description was provided for the case of starting the operation for updating the DeNB list by using the update of the neighboring eNB list as a trigger. However, another method described in the operation pattern 1 may be employed.

(1.4) Conclusion of First Embodiment

As described above, the MRN 300, which holds the DeNB list, is connected to the DeNB 200-1 existing on the DeNB list, and performs relay transmission between the DeNB 200-1 and the UE 100, designates a neighboring eNB 200, inquires the designated neighboring eNB 200 of whether to accept or refuse the MRN 300, and updates the DeNB list in response to an inquiry result. In this way, even when the MRN 300 moves, it is possible to allow the DeNB list to be adapted to the state of a movement destination.

In the operation patterns 1 and 2, the MRN 300 designates a neighboring eNB 200 not existing on the DeNB list. When the inquiry result for the designated neighboring eNB 200 indicates permission of the acceptance of the MRN 300, the MRN 300 updates the DeNB list such that the designated neighboring eNB 200 is added. In this way, as a movement result of the MRN 300, when a DeNB candidate capable of accepting the MRN 300 appears in the vicinity of the MRN 300, it is possible to add the new DeNB candidate to the DeNB list.

In the operation pattern 3, the MRN 300 designates a neighboring eNB 200 existing on the DeNB list. When the inquiry result for the designated neighboring eNB 200 indicates refusal of the acceptance of the MRN 300, the MRN 300 updates the DeNB list such that the designated neighboring eNB 200 is invalid. In this way, when one of DeNB candidates existing on the DeNB list does not accept the MRN 300, it is possible to exclude an eNB 20, which is not able to accept the MRN 300, from the DeNB candidates.

Furthermore, the inquiry includes information indicating that an inquiry source is "MRN". In this way, the neighboring eNB 200 recognizes that the inquiry source is "MRN" and then is able to determine the acceptance or refusal.

The MRN 300 designates a neighboring eNB 200 not existing on the DeNB list on the basis of a result obtained by comparing the neighboring eNB list notified from the OAM 500 via the DeNB 200-1 with the DeNB list held in the MRN 300. In this way, it is possible to appropriately designate the neighboring eNB 200 not existing on the DeNB list.

Alternatively, the MRN 300 designates a neighboring eNB 200 not existing on the DeNB list on the basis of a radio signal received in the MRN 300 from the neighboring eNB 200. In this way, it is possible to appropriately designate the neighboring eNB 200 not existing on the DeNB list.

In the operation pattern 1, the MRN 300 inquires the designated neighboring eNB 200 of whether the neighboring eNB 200 has the DeNB function. In this way, it is possible to add only the neighboring eNB 200 having the DeNB function to the DeNB list.

In the operation patterns 2 and 3, the MRN 300 notifies the designated neighboring eNB 200 of the load state of the MRN 300. In this way, the neighboring eNB 200 is able to determine whether it is possible to accept the MRN 300 on the basis of its own load state and the load state of the MRN 300.

The MRN 300 notifies the OAM 500 of the whole or an updated part of the updated DeNB list via the DeNB 200-1. In this way, the OAM 500 is able to notify another MRN 300 around the DeNB 200-1 of the updated DeNB list. Thus, the other MRN 300 is able to use an optimized DeNB list. Alternatively, the OAM 500 may hold the DeNB list as back-up and notify the MRN 300 of the DeNB list according to necessity.

(2) Second Embodiment

Hereinafter, the second embodiment will be described while focusing on the differences from the aforementioned first embodiment.

In the present embodiment, an operation when the MRN 300 performs handover using the aforementioned DeNB list will be mainly described.

(2.1) Operation According to Second Embodiment

Hereinafter, the operation of the mobile communication system according to the present embodiment will be described.

In the following operation patterns 1 to 4, in a mobile communication system in which the eNB 200 performs determination regarding the handover of the UE 100 connected to the eNB 200, the MRN 300, which is connected to the DeNB 200-1 and performs relay transmission between the DeNB 200-1 and the UE 100, performs determination regarding the handover of the MRN 300. Then, the MRN 300 transmits a handover request to a target eNB 200 using the X2 interface that is established between the MRN 300 and the target eNB 200.

(2.1.1) Operation Pattern 1

Figure 12:
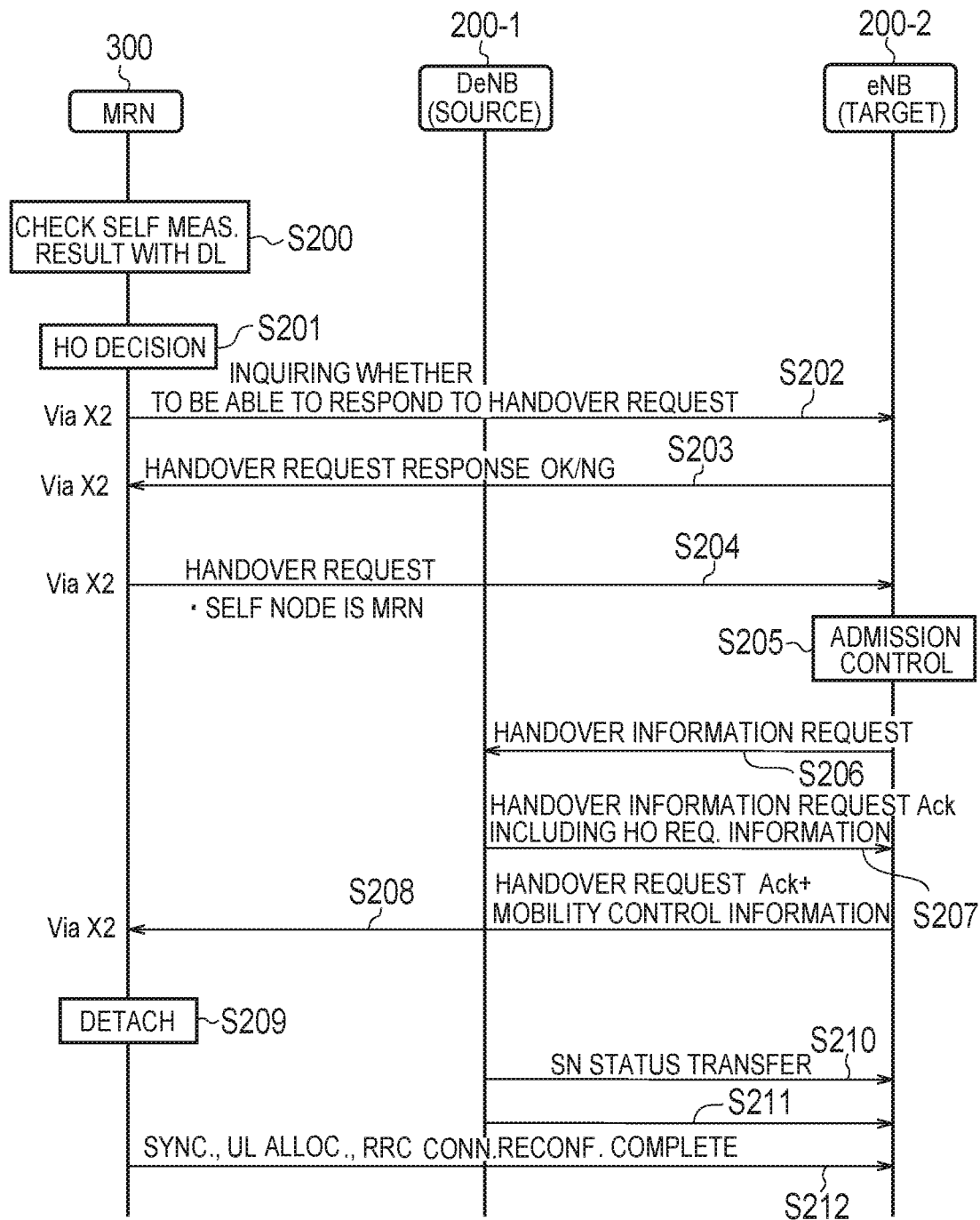
FIG. 12 is a sequence diagram of an operation pattern 1 according to a second embodiment.

FIG. 12 is a sequence diagram of the operation pattern 1 according to the embodiment. In an initial state of the present sequence, it is assumed that the MRN 300 is being connected to the DeNB 200-1 to perform relay transmission.

As illustrated in FIG. 12, in step S200, the MRN 300 checks a measurement result of a received reference signal and a held DeNB list.

In step S201, the MRN 300 performs handover determination in response to a check result in step S200. For example, when a DeNB candidate with RSRP higher than that of a DeNB 200-1 during current connection exists on the DeNB list, the MRN 300 decides the DeNB candidate as a target eNB.

Hereinafter, a description will be given on the assumption that the eNB 200-2 is decided as the target eNB by such handover determination.

In step S202, the MRN 300 inquires the eNB 200-2 of whether the eNB 200-2 is able to respond to a handover request from the MRN 300 through the X2 interface. In addition, step S202 may be performed before step S201.

In step S203, the eNB 200-2 notifies the MRN 300 of whether the eNB 200-2 is able to respond to the handover request from the MRN 300 through the X2 interface in response to the inquiry from the MRN 300.

Hereinafter, a description will be given on the assumption that the eNB 200-2 is able to respond to the handover request from the MRN 300.

In step S204, the MRN 300 transmits a handover request for requesting the acceptance for the MRN 300 to the eNB 200-2 through the X2 interface. The handover request includes information indicating that a transmission source of the handover request is "MRN". In general, the handover request is transmitted, so that a preparation step (Preparation) in the handover procedure is started. Until the handover procedure is completed, the DeNB 200-1 is a "source eNB".

In step S205, the eNB 200-2 determines whether to permit or reject the handover request on the basis of the handover request from the MRN 300. Hereinafter, a description will be given on the assumption that the eNB 200-2 determines to permit the handover request.

In step S206, the eNB 200-2 requests the DeNB 200-1 to transmit information for the handover of the MRN 300 through the X2 interface.

In step S207, the DeNB 200-1 transmits the information for the handover of the MRN 300 to the eNB 200-2 through the X2 interface together with a permission response (Ack) for the request from the eNB 200-2. The information for the handover of the MRN 300 includes X2 signaling context reference, S1 EPC signaling context reference, target cell ID, RRC context, AS configuration, E-RAB context and the like of the MRN 300.

In step S208, the eNB 200-2 notifies, on the X2 interface, the MRN 300 of information necessary for establishing a connection to the eNB 200-2 together with a permission response (Ack) for the handover request from the MRN 300. The information necessary for communicating with the eNB 200-2, for example, includes a new C-RNTI and security algorithm identifier, dedicated RACH preamble and SIB as an option, and the like.

In step S209, the MRN 300 disconnects a connection to the DeNB 200-1 in response to the reception of a handover permission response from the eNB 200-2. Then, the MRN 300 performs a process (a random access process, an RRC connection establishment process and the like) for establishing a connection to the eNB 200-2 (step S212). Meanwhile, the DeNB 200-1 performs a process (data forwarding) of forwarding data not to be transmitted to MRN 300 to the eNB 200-2 through the X2 interface (steps S210 and S211).

In this way, when the handover procedure is completed, the eNB 200-2 serves as a new DeNB of the MRN 300.

(2.1.2) Operation Pattern 2

Figure 13:
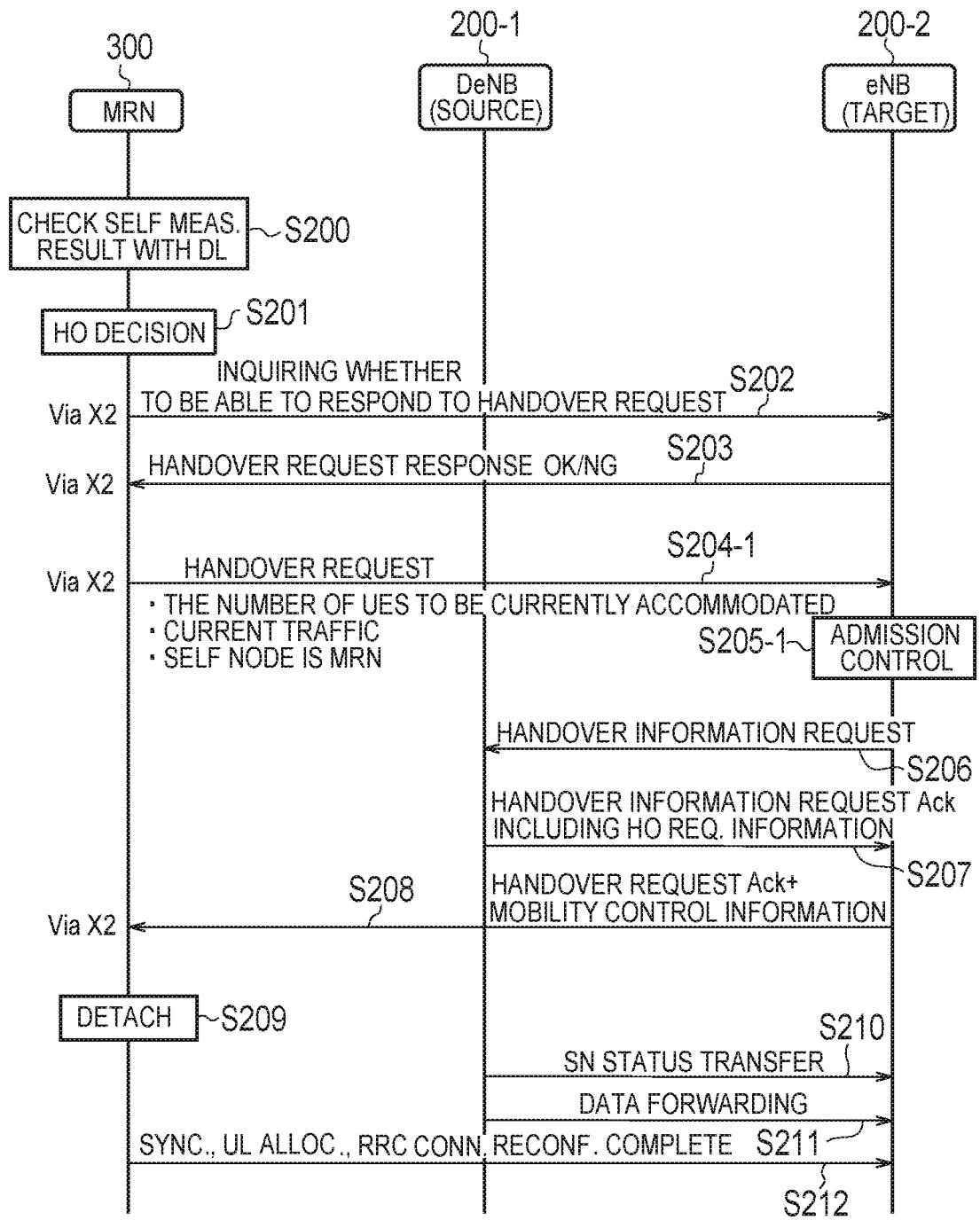
FIG. 13 is a sequence diagram of an operation pattern 2 according to the second embodiment.

FIG. 13 is a sequence diagram of the operation pattern 2 according to the embodiment. Hereinafter, only differences from the operation pattern 1 according to the present embodiment will be described.

As illustrated in FIG. 13, in the operation pattern 2, when transmitting a handover request to a target eNB 200-2, the MRN 300 transmits information indicating a load state of the MRN 300 together with the handover request (step S204-1).

The load state includes the number of UEs 100 accommodated by the MRN 300 (specifically, the number of UEs 100 being connected to the MRN 300), the amount of traffic dealt by the MRN 300, or the like. In addition, the load state may include a potential load state (for example, processing capability such as the maximum number of UEs 100 that may be accommodated or the maximum amount of traffic), as well as an actual load state.

After the information indicating the load state of the MRN 300 is received together with the handover request, the target eNB 200 determines whether to permit the handover request on the basis of the information indicating the load state of the MRN 300 (step S205-1).

Specifically, the eNB 200-2 compares a margin based on its own load state with the load state of the MRN 300, and determines whether a problem does not occur after a connection to the MRN 300 is established.

(2.1.3) Operation Pattern 3

In the operation pattern 3 according to the present embodiment, the MRN 300 performs a process of adjusting a transmission timing of a handover request before transmitting the handover request (step S204).

Specifically, when the movement speed of the MRN 300 exceeds a threshold value, the MRN 300 adjusts the transmission timing of the handover request to be advanced more than a normal timing. Furthermore, when the movement speed of the MRN 300 is equal to or less than the threshold value, the MRN 300 returns the transmission timing of the handover request to the normal timing.

For example, a case is considered, in which in the handover determination (step S201), when a DeNB candidate with RSRP higher than that of the DeNB 200-1 during current connection exists on the DeNB list, the MRN 300 decides the DeNB candidate as a target eNB. In such a case, when the movement speed of the MRN 300 exceeds the threshold value, the MRN 300 corrects (offsets) the RSRP of the DeNB 200-1 during current connection to be low or corrects (offsets) the RSRP of the DeNB candidate to be high, so that a trigger of handover easily occurs and a handover request timing can be advanced.

Alternatively, a case is considered, in which in the handover determination (step S201), when the RSRP of the DeNB candidate exceeds the threshold value, the MRN 300 decides the DeNB candidate as a target eNB. In such a case, the MRN 300 corrects (offsets) the RSRP of the DeNB candidate to be high or lowers the threshold value, so that a trigger of handover easily occurs and a handover request timing can be advanced.

Furthermore, when the movement speed of the MRN 300 exceeds the threshold value, the MRN 300 may transmit the handover request without inquiring the eNB 200-2 of whether the eNB 200-2 responds to the handover request from the MRN 300 (step S202).

(2.1.4) Operation Pattern 4

In the operation pattern 4 according to the present embodiment, the MRN 300 performs the handover determination (step S201) using a DeNB list with additional information.

FIG. 14 is a configuration diagram of the DeNB list used in the operation pattern 4. As illustrated in FIG. 14, the DeNB list used in the operation pattern 4 includes information on the position, cell direction, capacity, and cell size of each (identifier of) DeNB candidate.

The MRN 300 determines a target eNB on the basis of the DeNB list. Specifically, the MRN 300 decides whether the DeNB candidate is appropriate as the target eNB under (the whole or a part of) the following conditions.

Firstly, when the position of the DeNB candidate coincides with the movement direction of the MRN 300, the MRN 300 determines that the DeNB candidate is appropriate.

Secondly, when the cell direction (the cell formation position) of the DeNB candidate coincides with the movement direction of the MRN 300, the MRN 300 determines that the DeNB candidate is appropriate.

Thirdly, for the capacity of the DeNB candidate and the load state (the number of connections/traffic) of the MRN 300, when the load state is within the capacity range of the DeNB candidate, the MRN 300 determines that the DeNB candidate is appropriate.

Fourthly, for the size of a service area of the DeNB candidate and the movement speed of the MRN 300, when an area passage time of the DeNB candidate is equal to or more than a constant reference, the MRN 300 determines that the DeNB candidate is appropriate.

In addition, as an application, when there are no DeNB candidates, a list of the DeNB candidates may be updated. An operation in this case will be described in a third embodiment.

Furthermore, in the present operation pattern, the case, in which the information on the position, the cell direction, the capacity, and the cell size is included in the DeNB list, was described. However, the information may be included in the neighboring eNB list. In this case, the neighboring eNB list includes information on the position, the cell direction, the capacity, and the cell size of (an identifier of) each eNB. Then, the MRN 300 may perform the handover determination using the neighboring eNB list.

(2.2) Conclusion of Second Embodiment

As described above, in the mobile communication system in which the eNB 200 performs determination regarding the handover of the UE 100 connected to the eNB 200, the MRN 300, which is connected to the DeNB 200-1 and performs relay transmission between the DeNB 200-1 and the UE 100, performs determination regarding the handover of the MRN 300. In this way, the MRN 300 is able to perform optimal handover determination in response to its own state or the state and the like of the DeNB candidate. Furthermore, it is possible to perform the handover determination without transmitting a measurement report from the MRN 300 to the DeNB 200-1, so that it is possible to save a radio resource for the measurement report.

The MRN 300 inquires the target eNB 200 of whether the target eNB 200 is able to respond to the handover request from the MRN 300. In this way, the MRN 300 confirms that the target eNB 200 is able to respond to its own handover request, and then is able to transmit the handover request to the target eNB 200.

The MRN 300 transmits the handover request to the target eNB 200 using the X2 interface established between the MRN 300 and the target eNB 200. In this way, it is possible to transmit the handover request from the MRN 300 to the target eNB 200 without performing the handover determination by the DeNB 200-1, so that it is possible to reduce the load of the DeNB 200-1, and to quickly perform handover.

The handover request includes information indicating that a transmission source of the handover request is "MRN". In this way, the target eNB 200 recognizes that the transmission source of the handover request is "MRN", and then is able to determine whether to permit the handover request.

The target eNB 200 requests the DeNB 200-1 to transmit the information for the handover of the MRN 300 in response to the reception of the handover request from the MRN 300. The DeNB 200-1 transmits the information for the handover of the MRN 300 to the target eNB 200 in response to the request from the target eNB 200. In this way, even when the handover of the MRN 300 is performed at the initiative of the MRN 300, the target eNB 200 is able to acquire the information for the handover of the MRN 300 from the DeNB 200-1.

The target eNB 200 receives the information for the handover of the MRN 300 from the DeNB 200-1, and then transmits a handover permission response (Handover Request Ack) including the information for the handover of the MRN 300 to the MRN 300 using the X2 interface. In this way, it is possible to transmit the handover permission response from the target eNB 200 to the MRN 300 without performing the handover determination by the DeNB 200-1, so that it is possible to reduce the load of the DeNB 200-1, and to quickly perform handover.

In the operation pattern 2, in the handover procedure of the MRN 300 to the target eNB 200, when transmitting the handover request to the target eNB 200, the MRN 300 transmits the information indicating the load state of the MRN 300 together with the handover request. The target eNB 200 receives the information indicating the load state of the MRN 300 together with the handover request, and then determines whether to permit the handover request on the basis of the information indicating the load state of the MRN 300. In this way, the target eNB 200 is able to determine whether to permit the handover request on the basis of its own load state and the load state of the MRN 300.

In the operation pattern 3, the MRN 300 transmits the handover request at the timing corresponding to its own movement speed. In this way, for example, it is possible to reduce handover failure frequency when the MRN 300 moves at a high speed.

In the operation pattern 4, the MRN 300 decides the target eNB 200 on the basis of the DeNB list that is a list of DeNB candidates. The DeNB list includes information on at least one of the position, cell direction, capacity, and cell size of each DeNB candidate. In this way, the MRN 300 is able to decide whether the DeNB candidate is set as the target eNB in consideration of at least one of the position, cell direction, capacity, and cell size of the DeNB candidate.

(3) Third Embodiment

Hereinafter, the third embodiment will be described while focusing on the differences from the aforementioned each embodiment. The present embodiment corresponds to an application example of the second embodiment.

(3.1) Operation According to Third Embodiment

Hereinafter, the operation of the mobile communication system according to the present embodiment will be described.

In the present embodiment, when it is not possible to perform the handover of the MRN 300 to a DeNB candidate existing on the DeNB list, the MRN 300 acquires a DeNB list held by another MRN connected to predetermined eNB (a predetermined base station) from the other MRN.

Furthermore, as described in the operation pattern 4 of the second embodiment, the "predetermined eNB" indicates a "current eNB" or a "DeNB candidate existing on the DeNB list" when a DeNB candidate appropriate as a target eNB does not exist on the DeNB list. Alternatively, the "predetermined eNB" indicates the "target eNB" when the handover request from the MRN 300 is rejected by the target eNB. The following operation pattern 1 corresponds to the former case and the following operation pattern 2 corresponds to the latter case.

(3.1.1) Operation Pattern 1

Figure 15:
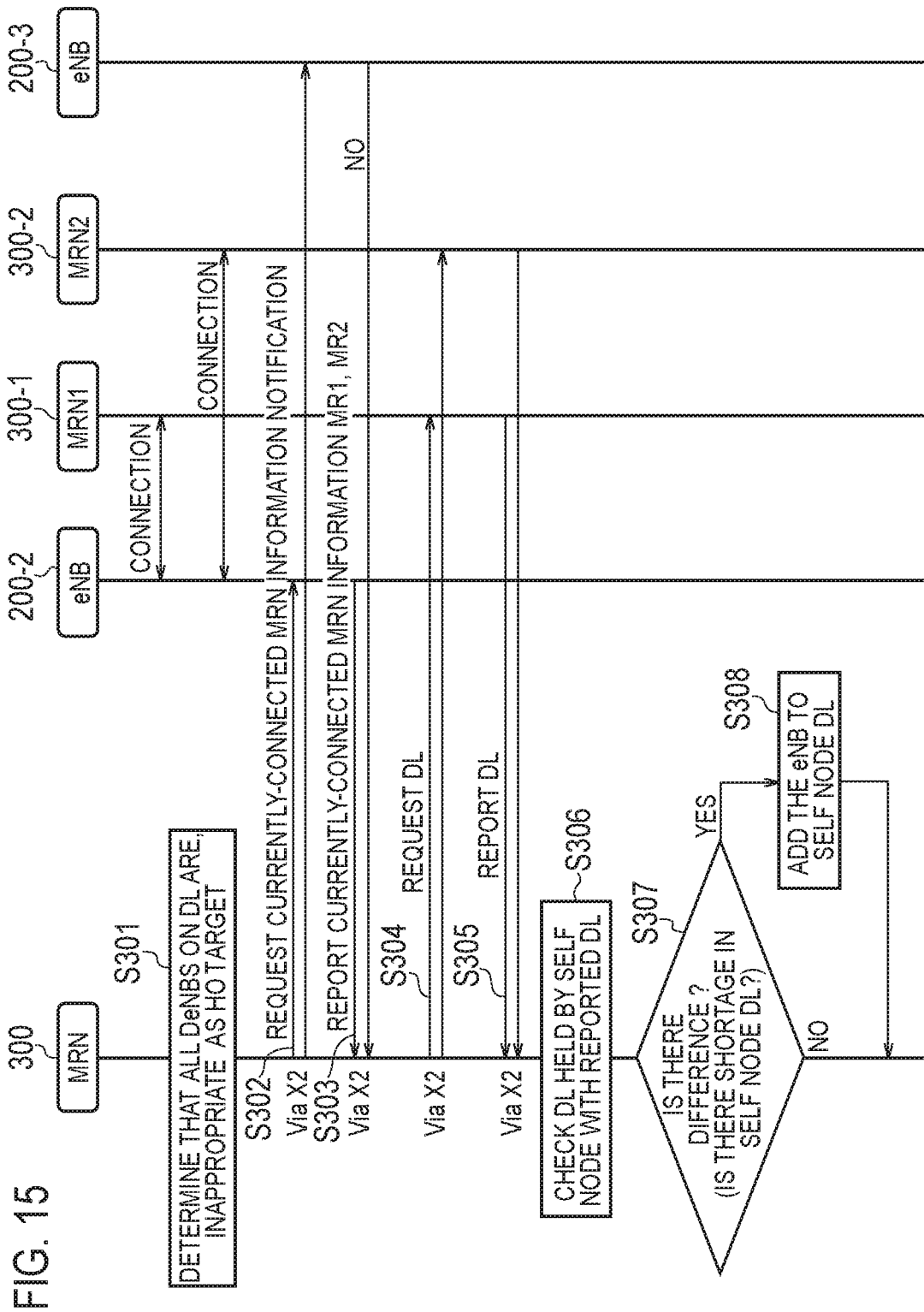
FIG. 15 is a sequence diagram of an operation pattern 1 according to a third embodiment.

FIG. 15 is a sequence diagram of an operation pattern 1 according to the present embodiment. Hereinafter, a description will be provided for the case in which when a DeNB candidate appropriate as a target eNB does not exist on the DeNB list, an eNB 200-2 and eNB 200-3 serving as DeNB candidates existing on the DeNB list are set as the "predetermined eNB". Another MRN 1 (MRN 300-1) and another MRN 2 (MRN 300-2) are connected to the eNB 200-2.

In step S301, the MRN 300 determines that all DeNB candidates existing on the DeNB list are not appropriate as the target eNB.

In step S302, the MRN 300 inquires the eNB 200-2 and the eNB 200-3 serving as the DeNB candidates existing on the DeNB list of MRN (or RN) during connection through the X2 interface.

In step S303, the eNB 200-2 and the eNB 200-3 notify the MRN 300 of the MRN during connection through the X2 interface. Furthermore, the eNB 200-2 notifies the MRN 300 of an identifier of the MRN 300-1 and an identifier of the MRN 300-2. The eNB 200-3 notifies the MRN 300 of the fact that there is no MRN during connection.

In step S304, the MRN 300 accesses the MRN 300-1 and the MRN 300-2 through the X2 interface on the basis of the notification from the eNB 200-2, and requests a DeNB list.

In step S305, each of the MRN 300-1 and the MRN 300-2 notifies (reports) the MRN 300 of a DeNB list held therein through the X2 interface.

In step S306, the MRN 300 checks a DeNB list held therein and the DeNB lists received from the MRN 300-1 and the MRN 300-2.

In step S307, the MRN 300 determines whether there is a difference between the DeNB list held therein and the DeNB lists received from the MRN 300-1 and the MRN 300-2. Specifically, the MRN 300 confirms whether a DeNB candidate not existing on the DeNB list held therein exists on the DeNB lists received from the MRN 300-1 and the MRN 300-2.

When such a DeNB candidate exists (step S307; Yes), the MRN 300 updates its own DeNB list such that the DeNB candidate is added in step S308. Specifically, the MRN 300 adds an identifier of the DeNB candidate to its own DeNB list. As a consequence, it is possible to start handover in which the DeNB candidate is set as the target eNB.

(3.1.2) Operation Pattern 2

Figures 16, 17:
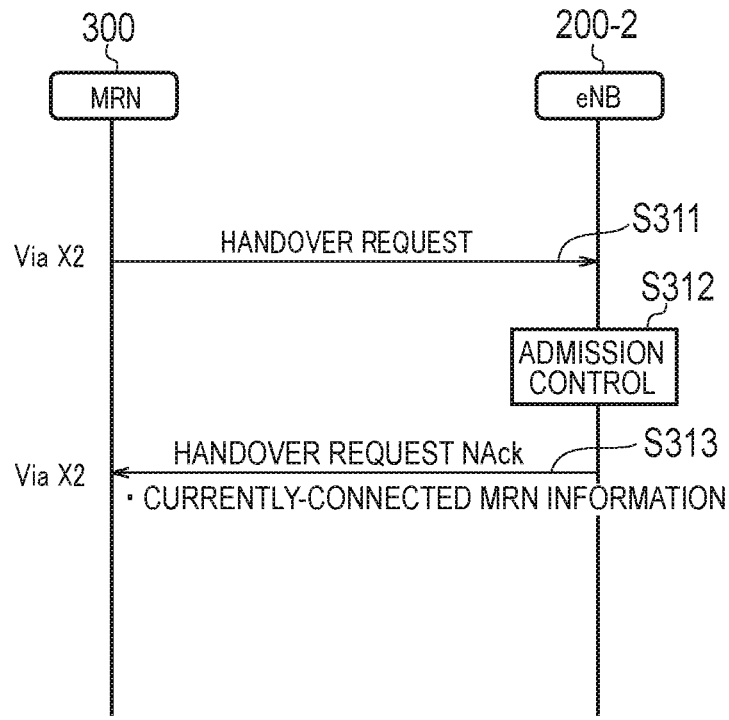
FIG. 16 is a sequence diagram of an operation pattern 2 according to the third embodiment.
FIG. 17 is a configuration diagram of a neighboring eNB list according to a fourth embodiment.

FIG. 16 is a sequence diagram of an operation pattern 2 according to the present embodiment. Hereinafter, a description will be provided for the case in which when the handover request from the MRN 300 is rejected by the eNB 200-2, the eNB 200-2 is set as the "predetermined eNB".

In step S311, the MRN 300 transmits the handover request to the eNB 200-2 through the X2 interface.

In step S312, the eNB 200-2 determines whether to permit or reject the handover request of the MRN 300. Hereinafter, a description will be given on the assumption that the eNB 200-2 determined to reject the handover request of the MRN 300.

In step S313, the eNB 200-2 notifies the MRN 300 of a handover negative acknowledgement (Nack) and MRN (or RN) being connected to the eNB 200-2, through the X2 interface. Then, the same operations as those after step S304 of the operation pattern 1 are performed.

(3.2) Conclusion of Third Embodiment

As described above, when it is not possible to perform the handover of the MRN 300 in which the DeNB candidate existing on the DeNB list is set as the target eNB 200, the MRN 300 acquires the DeNB list held by another MRN connected to the eNB 200-2 existing on the DeNB list from the other MRN. Then, the MRN 300 decides a new target eNB from the acquired DeNB list. In this way, even when it is not possible to perform the handover of the MRN 300 in which the DeNB candidate existing on the DeNB list is set as the target eNB 200, it is possible to attempt handover to the new target eNB using the DeNB list held by the other MRN.

In the present embodiment, the MRN 300 receives information on the other MRN connected to the eNB 200-2 from the eNB 200-2. In this way, the MRN 300 is able to recognize the other MRN connected to the eNB 200-2.

In the present embodiment, before the information on the other MRN connected to the eNB 200-2 is received from the eNB 200-2, the MRN 300 inquires the eNB 200-2 of the other MRN connected to the eNB 200-2. In this way, the eNB 200-2 is able to notify the MRN 300 of MRN connected to the eNB 200-2 in response to the request from the MRN 300.

In the present embodiment, the eNB 200-2 notifies the MRN 300 of the handover rejection response (Nack) for the MRN 300 and the information on the MRN during connection. In this way, the MRN 300 is able to recognize the other MRN connected to the eNB 200-2.

(4) Fourth Embodiment

Hereinafter, the fourth embodiment will be described while focusing on the differences from the aforementioned each embodiment.

In the aforementioned second embodiment and third embodiment, the handover of the MRN 300 is performed at the initiative of the MRN 300. However, in the present embodiment, the handover of the MRN 300 is performed at the initiative of the DeNB 200-1. That is, in the present embodiment, the handover of the MRN 300 is performed by applying a normal handover procedure in the LTE.

(4.1) Operation According to Fourth Embodiment

Hereinafter, the operation of the mobile communication system according to the present embodiment will be described.

In the present embodiment, the DeNB 200-1 determines whether to perform the handover of the MRN 300 to eNB (a cell) existing on the neighboring eNB list on the basis of a measurement report from the MRN 300. Furthermore, even though there is eNB existing on the neighboring eNB list, if the eNB does not have the DeNB function, it is meaningless to set the eNB as the target eNB. Thus, in the present embodiment, the neighboring eNB list is configured and managed as follows.

(4.1.1) Management of Neighboring eNB List

FIG. 17 is a configuration diagram of the neighboring eNB list according to the present embodiment.

As illustrated in FIG. 17, for (a cell ID (TCI) of) each neighboring eNB, the neighboring eNB list further includes information indicating whether the neighboring eNB has the DeNB function. For example, in the neighboring eNB having no DeNB function, a flag indicating that the neighboring eNB has no DeNB function is set. Other items are the same as those of a neighboring eNB list (called a "neighboring relation table (NRT)") of specifications. From the specifications, the neighboring eNB list may be updated by an ANR (Automatic Neighbour Relation) function.

The eNB 200 (DeNB 200-1) acquires information on the neighboring eNB list from the OAM 500 and manages the neighboring eNB list. In the present embodiment, when the MRN 300 is connected to the DeNB 200-1, the DeNB 200-1 requests the OAM 500 to transmit information for updating the neighboring eNB list. Then, the DeNB 200-1 updates the neighboring eNB list in response to the information from the OAM 500.

(4.1.2) Handover Procedure (4.1.2.1) Operation Pattern 1

FIG. 18 is a sequence diagram of an operation pattern 1 according to the present embodiment.

As illustrated in FIG. 18, in step S401, the MRN 300 transmits a measurement report to the DeNB 200-1.

In step S402, the DeNB 200-1 designates neighboring eNBs having the DeNB function on the basis of the neighboring eNB list (NL or NRT).

In step S403, the DeNB 200-1 decides a target eNB from the neighboring eNBs designated in step S402 on the basis of the measurement report from the MRN 300. For example, the DeNB 200-1 decides the neighboring eNB, which was designated in step S402 and has high RSRP indicated by the measurement report, as the target eNB. Hereinafter, a description will be given on the assumption that the eNB 200-2 is determined as the target eNB.

In step S404, the DeNB 200-1 transmits a handover request to the target eNB 200-2 through the X2 interface.

In step S405, the target eNB 200-2 determines whether to permit or reject the handover request from the DeNB 200-1. Then, the normal handover procedure is performed.

(4.1.2.2) Operation Pattern 2

FIG. 19 is a sequence diagram of an operation pattern 2 according to the present embodiment. Hereinafter, differences from the operation pattern 1 according to the present embodiment will be described.

As illustrated in FIG. 19, in step S401-1, when transmitting the measurement report to the DeNB 200-1, the MRN 300 notifies the DeNB 200-1 of its own load state. However, the notification timing of the load state may be different from the timing of the measurement report. In addition, when the DeNB 200-1 has recognized the load state of the MRN 300, the notification of the load state of the MRN 30 to the DeNB 200-1 may omit.

The load state includes the number of UEs 100 accommodated by the MRN 300 (specifically, the number of UEs 100 being connected to the MRN 300), the amount of traffic dealt by the MRN 300, or the like. In addition, the load state may include a potential load state (for example, processing capability such as the maximum number of UEs 100 that may be accommodated or the maximum amount of traffic), as well as an actual load state.

Step S402 and step S403 are equal to those of the operation pattern 1.

In step S404-1, when transmitting handover request to the target eNB 200-2 through the X2 interface, the DeNB 200-1 notifies the DeNB 200-1 of the load state of the MRN.

In step S405-1, the target eNB 200-2 determines whether to permit or reject the handover request from the DeNB 200-1 in consideration of the load state of the MRN. Specifically, the eNB 200-2 compares a margin based on its own load state with the load state of the MRN 300, and determines whether a problem does not occur after a connection to the MRN 300 is established. Then, the normal handover procedure is performed.

(4.2) Conclusion of Fourth Embodiment

As described above, for each neighboring eNB, the neighboring eNB list further includes the information indicating whether the neighboring eNB has the DeNB function. In this way, the eNB 200 (the DeNB 200-1) is able to decide the target eNB 200 from the neighboring eNBs having the DeNB function on the basis of the neighboring eNB list.

When the MRN 300 is connected to the DeNB 200-1, the DeNB 200-1 requests the OAM 500 to transmit the information for updating the neighboring eNB list. Then, the DeNB 200-1 updates the neighboring eNB list in response to the information from the OAM 500. In this way, before the handover of the MRN 300 is generated, it is possible to allow the neighboring eNB list to be in the latest state.

In the case in which the handover request from the DeNB 200-1 has received, when the target eNB 200 does not have the DeNB function, the target eNB 200 transmits information indicating the fact that the target eNB 200 does not have the DeNB function to the DeNB 200-1, together with a rejection response for the handover request. Then, the DeNB 200-1 updates the neighboring eNB list in response to the reception of the information indicating the fact that the target eNB 200 does not have DeNB function from the target eNB

200. In this way, it is possible to correct the neighboring eNB list using the handover procedure.

In the operation pattern 2, the DeNB 200-1 transmits the information indicating the load state of the MRN 300 to the target eNB 200, together with the handover request. The target eNB 200 receives the information indicating the load state of the MRN 300 together with the handover request, and then determines whether to permit the handover request on the basis of the information indicating the load state of the MRN 300. In this way, the target eNB 200 is able to determine whether to permit the handover request on the basis of its own load state and the load state of the MRN 300.

(5) Fifth Embodiment

Hereinafter, the fifth embodiment will be described while focusing on the differences from the aforementioned each embodiment.

In the present embodiment, the handover procedure according to the aforementioned second embodiment, that is, the handover of the MRN 300 is basically performed at the initiative of the MRN 300 and the DeNB 200-1 also performs handover determination as with the aforementioned fourth embodiment.

(5.1) Operation According to Fifth Embodiment

FIG. 20 is an operation sequence diagram according to the present embodiment. In an initial state of the present sequence, it is assumed that the MRN 300 is performing relay transmission by connection to the DeNB 200-1.

As illustrated in FIG. 20, in step S501, the MRN 300 checks a measurement result of a received reference signal and a held DeNB list.

In step S502, the MRN 300 performs handover determination in response to a check result in step S501. For example, when a DeNB candidate with RSRP higher than that of a DeNB 200-1 during current connection exists on the DeNB list, the MRN 300 decides the DeNB candidate as a target eNB.

Hereinafter, a description will be given on the assumption that the eNB 200-2 is determined as the target eNB by such handover determination. However, one or a plurality of target eNBs may be determined in step S502.

In step S503, the MRN 300 inquires the DeNB 200-1 of whether the DeNB 200-1 is able to respond to a handover request from the MRN 300. In addition, step S503 may be performed before step S502.

In step S504, the DeNB 200-1 inquires the MRN 300 of whether the DeNB 200-1 is able to respond to the handover request from the MRN 300 in response to the inquiry from the MRN 300.

Hereinafter, a description will be given on the assumption that the DeNB 200-1 is able to respond to the handover request from the MRN 300.

In step S505, the MRN 300 transmits a handover request for requesting handover to the eNB 200-2 to the DeNB 200-1 through the X2 interface. The handover request includes an identifier of the eNB 200-2. When there are a plurality of target eNBs, the handover request includes identifiers of the plurality of target eNBs. Furthermore, the handover request may include information indicating that a transmission source of the handover request is "MRN".

In step S506, the DeNB 200-1 determines whether handover is possible for each target eNB 200 on the basis of (the identifier included in) the handover request from the MRN 300. For example, as described in the fourth embodiment, it is possible to perform determination on the basis of the presence or absence of the DeNB function.

Hereinafter, a description will be given on the assumption that the DeNB 200-1 determined that handover to the target eNB 200 is possible.

In step S507, the DeNB 200-1 transmits the handover request to the target eNB 200-2 through the X2 interface.

In step S508, the target eNB 200-2 determines whether to permit or reject the handover request from the DeNB 200-1. Then, the normal handover procedure is performed.

In addition, also in the present embodiment, it is possible to consider the load state of the MRN 300 similarly to the operation pattern 2 according to the fourth embodiment.

Furthermore, the handover procedure according to the present embodiment and the handover procedure according to the second embodiment may be separately used. For example, when the DeNB 200-1 responds to the handover request from the MRN 300 and the target eNB 200-2 does not respond to the handover request from the MRN 300, the handover procedure according to the present embodiment may be applied. Alternatively, when an elapsed time from the update of the DeNB list held by the MRN 300 is within a threshold value, the handover procedure according to the second embodiment may be applied, and when the elapsed time exceeds the threshold value, the handover procedure according to the present embodiment may be applied.

(5.2) Conclusion of Fifth Embodiment

As described above, in the mobile communication system in which the eNB 200 performs determination regarding the handover of the UE 100 connected to the eNB 200, the MRN 300, which is connected to the DeNB 200-1 and performs relay transmission between the DeNB 200-1 and the UE 100, performs determination regarding the handover of the MRN 300. In this way, the MRN 300 is able to perform optimal handover determination in response to its own state, that is, a situation unique to the MRN 300.

The MRN 300 allows one identifier or a plurality of identifiers of the target eNB 200 to be included in the handover request and then transmits the handover request to the DeNB 200-1. The DeNB 200-1 determines whether handover is possible for each target eNB 200 on the basis of the handover request from the MRN 300. In this way, the DeNB 200-1 is able to determine whether the target eNB 200 determined by the MRN 300 is appropriate. Consequently, it is possible to determine the target eNB 200 more appropriately.

In the present embodiment, the MRN 300 inquires the DeNB 200-1 of whether the DeNB 200-1 is able to respond to the handover request from the MRN 300. In this way, after confirming that the DeNB 200-1 is able to respond to the handover request from the MRN 300, it is possible to transmit the handover request from the MRN 300 to the DeNB 200-1.

(6) Other Embodiments

It should not be understood that those descriptions and drawings constituting a part of the present disclosure limit the present disclosure. Further, various substitutions, examples, or operational techniques shall be apparent to a person skilled in the art on the basis of this disclosure.

The aforementioned first embodiment to fifth embodiment may be performed separately and independently and may also be performed through a combination thereof. For example, the DeNB list acquisition method described in the third embodiment may be applied to the fifth embodiment.

In the aforementioned each embodiment, the MRN 300 serving as a movable relay station was described as an example, and the present disclosure may also be applied to an unmovable relay station. For example, when a new eNB is installed in the vicinity of the relay station or when an existing eNB stops its own operation, since a peripheral situation of the relay station is changed, it may be necessary to update the DeNB list (DL) and the neighboring eNB list (NL or NRT) or perform the handover of the relay station.

INDUSTRIAL APPLICABILITY

As described above, the communication control method according to the present disclosure can support a movable relay station and thus, the present disclosure is useful in a radio communication field.

The invention claimed is:

1. A method applied to a mobile communication system, comprising:
   receiving from a base station, by a first communication apparatus, first information indicating that the base station supports a communication apparatus that acts as a relay apparatus relaying traffic between the base station and another communication apparatus;
   transmitting to the base station, by the first communication apparatus based on the first information, second information indicating that the first communication apparatus is acting as the relay apparatus relaying traffic between the base station and another communication apparatus; and
   transmitting to the base station, third information indicating expected data amount of the first communication apparatus.

2. A first communication apparatus, comprising:
   a processor and a memory coupled to the processor, the processor configured to perform processes of:
   receiving, from a base station, first information indicating that the base station supports a communication apparatus that acts as a relay apparatus relaying traffic between the base station and another communication apparatus;
   transmitting to the base station, based on the first information, second information indicating that the first communication apparatus is acting as the relay apparatus relaying traffic between the base station and another communication apparatus; and
   transmitting to the base station, third information indicating expected data amount of the first communication apparatus.

3. A chipset included in a first communication apparatus, the chipset comprising:
   a processor and a memory coupled to the processor, the processor configured to perform processes of:
   receiving, from a base station, first information indicating that the base station supports a communication apparatus that acts as a relay apparatus relaying traffic between the base station and another communication apparatus;
   transmitting to the base station, based on the first information, second information indicating that the first communication apparatus is acting as the relay apparatus relaying traffic between the base station and another communication apparatus; and
   transmitting to the base station, third information indicating expected data amount of the first communication apparatus.

* * * * *